US012645590B2

(12) United States Patent
Karr

(10) Patent No.: US 12,645,590 B2
(45) Date of Patent: Jun. 2, 2026

(54) DETECTING MODIFICATIONS TO RECENTLY STORED DATA

(71) Applicant: PURE STORAGE, INC., Santa Clara, CA (US)

(72) Inventor: Ronald Karr, Palo Alto, CA (US)

(73) Assignee: EVERPURE, INC., Santa Clara, CA (US)

( * ) Notice: Subject to any disclaimer, the term of this patent is extended or adjusted under 35 U.S.C. 154(b) by 0 days.

(21) Appl. No.: 18/756,747

(22) Filed: Jun. 27, 2024

(65) Prior Publication Data

US 2024/0345955 A1     Oct. 17, 2024

Related U.S. Application Data

(63) Continuation-in-part of application No. 18/595,567, filed on Mar. 5, 2024, which is a continuation of
(Continued)

(51) Int. Cl.
| | |
|---|---|
| *G06F 12/08* | (2016.01) |
| *G06F 3/06* | (2006.01) |
| *G06F 12/0802* | (2016.01) |
| *G06F 12/122* | (2016.01) |
| *G06F 12/128* | (2016.01) |

(52) U.S. Cl.
CPC ........ *G06F 12/0802* (2013.01); *G06F 3/0608* (2013.01); *G06F 3/0641* (2013.01); *G06F 3/0685* (2013.01); *G06F 12/122* (2013.01); *G06F 12/128* (2013.01); *G06F 3/0656* (2013.01); *G06F 2212/1044* (2013.01)

(58) Field of Classification Search
CPC .. G06F 12/0802; G06F 3/0608; G06F 3/0641;

G06F 3/0685; G06F 12/122; G06F 12/128; G06F 3/0656; G06F 2212/1044; G06F 12/0866; G06F 2212/217; G06F 2212/401; G06F 2212/7205
USPC ......................................................... 711/136
See application file for complete search history.

(56) References Cited

U.S. PATENT DOCUMENTS

| | | | | |
|---|---|---|---|---|
| 8,315,984 B2 * | 11/2012 | Frandzel | ............... | G06F 3/0689 |
| | | | | 707/661 |
| 8,412,682 B2 | 4/2013 | Zheng et al. | | |

(Continued)

FOREIGN PATENT DOCUMENTS

| | | |
|---|---|---|
| WO | WO-0213033 A1 | 2/2002 |
| WO | WO-2008103569 A1 | 8/2008 |

OTHER PUBLICATIONS

Frakes Dan, Up close with Mountain Lion: Power Nap (Frakes, Dan, Working Mac—Up close with Mountain Lion: Power Nap, Macworld.com,Aug. 1, 2012, pp. 1-6.
(Continued)

*Primary Examiner* — Hua J Song

(57) ABSTRACT

Detecting modifications to recently stored data, including: generating, in a storage system, a set of fingerprints of stored data that is associated with recently received I/O requests; in response to receiving a write request, generating a fingerprint of write data of the write request; determining that at least a partial fingerprint match exists between one or more fingerprints of the set of fingerprints and the fingerprint of the write data; and based on the determination, generating a reduced combination of the stored data and the write data.

17 Claims, 14 Drawing Sheets

Related U.S. Application Data application No. 17/728,468, filed on Apr. 25, 2022, now Pat. No. 11,921,633, which is a continuation of application No. 16/892,221, filed on Jun. 3, 2020, now Pat. No. 11,360,682, which is a continuation of application No. 15/418,253, filed on Jan. 27, 2017, now Pat. No. 10,761,759, which is a continuation of application No. 14/722,249, filed on May 27, 2015, now Pat. No. 9,594,678.

(56) References Cited

U.S. PATENT DOCUMENTS

| | | | |
|---|---|---|---|
| 8,577,850 | B1 | 11/2013 | Genda et al. |
| 8,706,914 | B2 | 4/2014 | Duchesneau |
| 8,918,478 | B2 | 12/2014 | Ozzie et al. |
| 9,256,378 | B2 | 2/2016 | Zheng et al. |
| 9,275,063 | B1 | 3/2016 | Natanzon |
| 9,395,929 | B2 | 7/2016 | Bojinov et al. |
| 9,779,153 | B2 | 10/2017 | Jernigan, IV et al. |
| 9,811,551 | B1 | 11/2017 | Colgrove et al. |
| 9,817,865 | B2 | 11/2017 | Chambliss et al. |
| 9,830,273 | B2 | 11/2017 | Bk et al. |
| 9,910,742 | B1 | 3/2018 | Faibish et al. |
| 10,185,495 | B2 | 1/2019 | Katsuki |
| 10,235,044 | B2 | 3/2019 | Patterson, III et al. |
| 10,540,504 | B2 | 1/2020 | Hsu et al. |
| 12,174,708 | B2 | 12/2024 | Lewis et al. |
| 12,222,816 | B2 | 2/2025 | Dangi et al. |
| 2002/0188798 | A1* | 12/2002 | Kumaki ............... G11C 7/1006 |
| | | | 711/104 |
| 2013/0311434 | A1* | 11/2013 | Jones ..................... G06F 3/067 |
| | | | 707/692 |
| 2015/0100746 | A1 | 4/2015 | Rychlik et al. |
| 2015/0169665 | A1* | 6/2015 | Sorenson, III .......... G06F 16/23 |
| | | | 707/609 |
| 2015/0213049 | A1 | 7/2015 | Kleiman et al. |
| 2016/0142485 | A1 | 5/2016 | Mitkar et al. |
| 2017/0031994 | A1 | 2/2017 | Patterson, III et al. |
| 2017/0091183 | A1 | 3/2017 | Kenchammana-Hosekote et al. |
| 2017/0155713 | A1 | 6/2017 | Powell et al. |
| 2017/0161329 | A1 | 6/2017 | Chambliss et al. |
| 2017/0169233 | A1 | 6/2017 | Hsu et al. |
| 2018/0074748 | A1 | 3/2018 | Makin et al. |
| 2019/0272258 | A1 | 9/2019 | Chambliss et al. |
| 2022/0156114 | A1 | 5/2022 | Nagpal et al. |
| 2023/0350762 | A1 | 11/2023 | Mani et al. |

OTHER PUBLICATIONS

Kim J-K., et al., "Data Access Frequency Based Data Replication Method Using Erasure Codes in Cloud Storage System," Journal of the Institute of Electronics and Information Engineers, Feb. 2014, vol. 51, No. 2, pp. 85-91.

Schmid P., "RAID Scaling Charts, Part 3: 4-128 kB Stripes Compared," Tom's Hardware, Nov. 27, 2007, 24 Pages, XP055363126, Retrieved from URL: http://www.tomshardware.com/reviews/RAID-SCALING-CHARTS.1735-4.html.

Wong T.M., et al., "Verifiable Secret Redistribution for Archive Systems," Proceedings on First International IEEE Security in Storage Workshop (SISW'02), IEEE Xplore, Dec. 2002, 12 pages, DOI: 10.1109/SISW.2002.1183515.

* cited by examiner

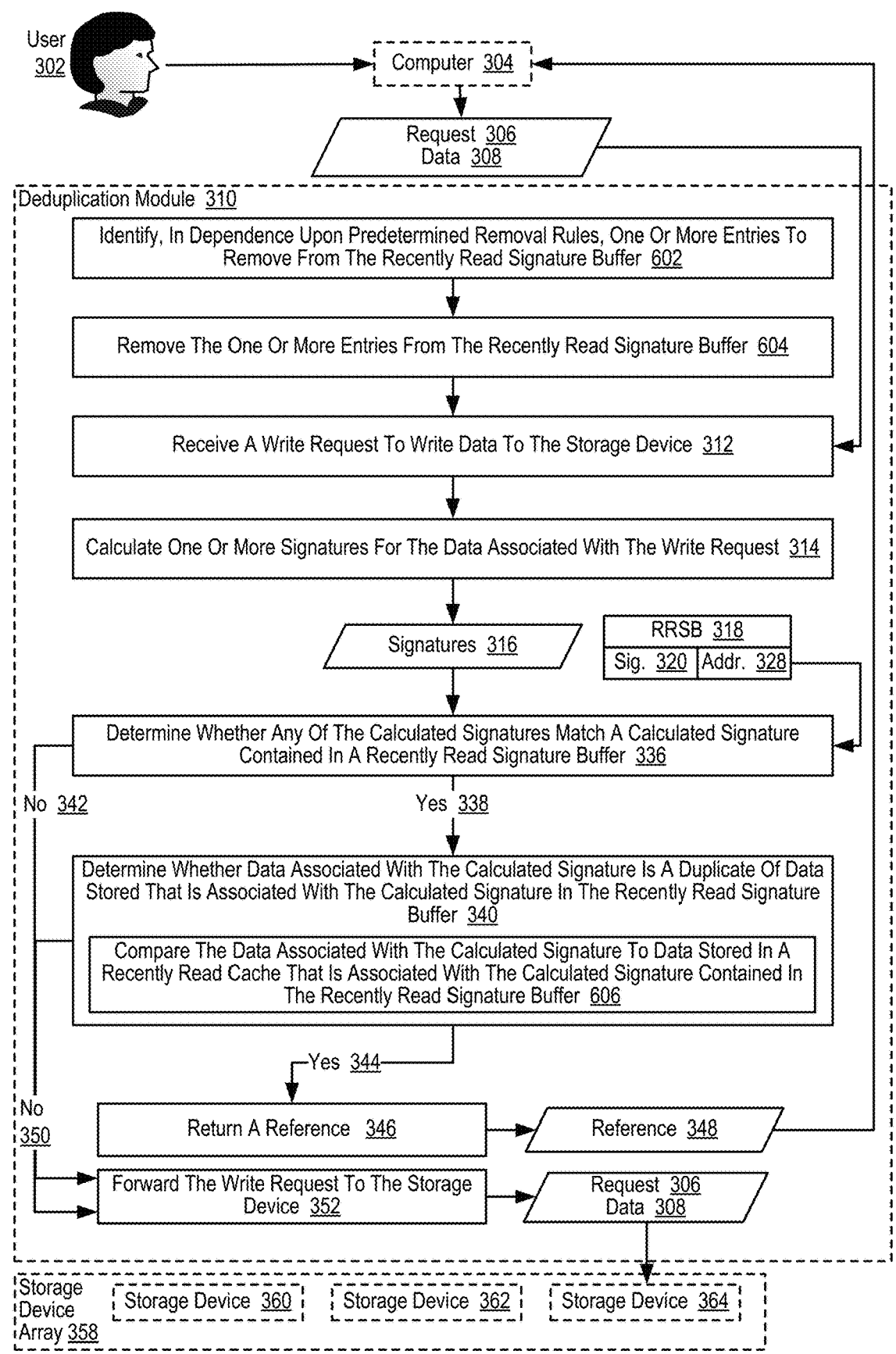

User 302

Computer 304

Request 306
Data 308

Deduplication Module 310

Identify, In Dependence Upon Predetermined Removal Rules, One Or More Entries To Remove From The Recently Read Signature Buffer 602

Remove The One Or More Entries From The Recently Read Signature Buffer 604

Receive A Write Request To Write Data To The Storage Device 312

Calculate One Or More Signatures For The Data Associated With The Write Request 314

Signatures 316

RRSB 318
Sig. 320 | Addr. 328

Determine Whether Any Of The Calculated Signatures Match A Calculated Signature Contained In A Recently Read Signature Buffer 336

No 342        Yes 338

Determine Whether Data Associated With The Calculated Signature Is A Duplicate Of Data Stored That Is Associated With The Calculated Signature In The Recently Read Signature Buffer 340

Compare The Data Associated With The Calculated Signature To Data Stored In A Recently Read Cache That Is Associated With The Calculated Signature Contained In The Recently Read Signature Buffer 606

Yes 344

No 350

Return A Reference 346

Reference 348

Forward The Write Request To The Storage Device 352

Request 306
Data 308

Storage Device Array 358

Storage Device 360        Storage Device 362        Storage Device 364

FIG. 6

DETECTING MODIFICATIONS TO RECENTLY STORED DATA

CROSS-REFERENCE TO RELATED APPLICATIONS

This is a continuation in-part application for patent entitled to a filing date and claiming the benefit of earlier-filed U.S. patent application Ser. No. 18/595,567, filed Mar. 5, 2024, herein incorporated by reference in its entirety, which is a continuation of U.S. Pat. No. 11,921,633, issued Mar. 5, 2024, which is a continuation of U.S. Pat. No. 11,360,682, issued Jun. 14, 2022, which is a continuation of U.S. Pat. No. 10,761,759, issued Sep. 1, 2020, which is a continuation of U.S. Pat. No. 9,594,678, issued Mar. 14, 2017.

BRIEF DESCRIPTION OF DRAWINGS

FIG. 6 sets forth a flow chart illustrating an additional example method for preventing duplicate entries of identical data in a storage device according to various embodiments.

DESCRIPTION OF EMBODIMENTS

Figure 1:
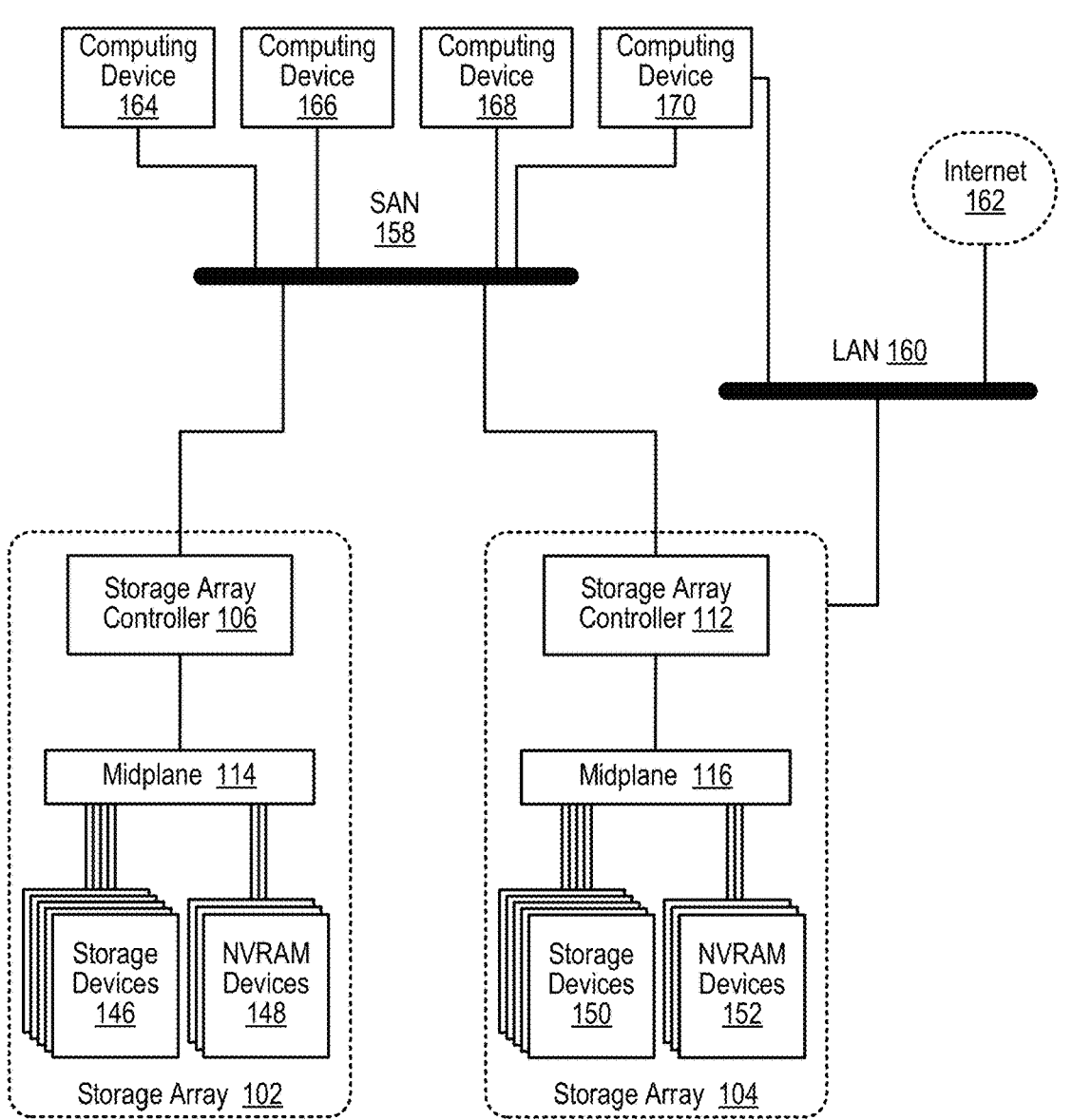
FIG. 1 sets forth a block diagram of an example system configured for preventing duplicate entries of identical data in a storage device according to various embodiments of the disclosure.

Example methods, apparatuses, and products for preventing duplicate entries of identical data in a storage device in accordance with the disclosed embodiments are described with reference to the accompanying drawings, beginning with FIG. 1. FIG. 1 sets forth a block diagram of a system configured for preventing duplicate entries of identical data in a storage device according to various embodiments. The system of FIG. 1 includes a number of computing devices (164, 166, 168, 170). Such computing devices may be implemented in a number of different ways. For example, a computing device may be a server in a data center, a workstation, a personal computer, a notebook, or the like.

The computing devices (164, 166, 168, 170) in the example of FIG. 1 are coupled for data communications to a number of storage arrays (102, 104) through a storage area network ('SAN') (158) as well as a local area network (160) ('LAN'). The SAN (158) may be implemented with a variety of data communications fabrics, devices, and protocols. Example fabrics for such a SAN (158) may include Fibre Channel, Ethernet, Infiniband, Serial Attached Small Computer System Interface ('SAS'), and the like. Example data communications protocols for use in such a SAN (158) may include Advanced Technology Attachment ('ATA'), Fibre Channel Protocol, SCSI, iSCSI, HyperSCSI, and others. Readers of skill in the art will recognize that a SAN is just one among many possible data communications couplings which may be implemented between a computing device (164, 166, 168, 170) and a storage array (102, 104). For example, the storage devices (146, 150) within the storage arrays (102, 104) may also be coupled to the computing devices (164, 166, 168, 170) as network attached storage ('NAS') or object services capable of facilitating file-level or "object" access, or even using SAN-NAS and/or object hybrids that offer file-level, object, and/or block-level protocols from the same systems or to the same storage server. Any other such data communications coupling is well within the scope of the embodiments described herein.

The local area network (160) of FIG. 1 may also be implemented with a variety of fabrics and protocols. Examples of such fabrics include Ethernet (802.3), wireless (802.11), and the like. Examples of such data communications protocols include Transmission Control Protocol ('TCP'), User Datagram Protocol ('UDP'), Internet Protocol ('IP'), HyperText Transfer Protocol ('HTTP'), Wireless Access Protocol ('WAP'), Handheld Device Transport Protocol ('HDTP'), Session Initiation Protocol ('SIP'), Real Time Protocol ('RTP') and others as will occur to those of skill in the art. The LAN 160 may also connect to the Internet 162.

The example storage arrays (102, 104) of FIG. 1 provide persistent data storage for the computing devices (164, 166, 168, 170). Each storage array (102, 104) depicted in FIG. 1 includes a storage array controller (106, 112). Each storage array controller (106, 112) may be embodied as a module of automated computing machinery comprising computer hardware, computer software, or a combination of computer hardware and software. The storage array controllers (106, 112) may be configured to carry out various storage-related tasks. Such tasks may include writing data received from the one or more of the computing devices (164, 166, 168, 170) to storage, erasing data from storage, retrieving data from storage to provide the data to one or more of the computing devices (164, 166, 168, 170), monitoring and reporting of disk utilization and performance, performing RAID (Redundant Array of Independent Drives) or RAID-like data redundancy operations, compressing data, encrypting data, and so on.

Each storage array controller (106, 112) may be implemented in a variety of ways, including as a Field Programmable Gate Array ('FPGA'), a Programmable Logic Chip ('PLC'), an Application Specific Integrated Circuit ('ASIC'), or computing device that includes discrete components such as a central processing unit, computer memory, and various adapters. Each storage array controller (106, 112) may include, for example, a data communications adapter configured to support communications via the SAN (158) and the LAN (160). Although only one of the storage array controllers (112) in the example of FIG. 1 is depicted as being coupled to the LAN (160) for data communications, readers will appreciate that both storage array controllers (106, 112) may be independently coupled to the LAN (160). Each storage array controller (106, 112) may also include, for example, an I/O controller or the like that couples the storage array controller (106, 112) for data communications, through a midplane (114), to a number of storage devices (146, 150), and a number of non-volatile Random Access Memory ('NVRAM') devices (148, 152).

Each NVRAM device (148, 152) may be configured to receive, from the storage array controller (106, 112), data to be stored in the storage devices (146). Such data may originate from any one of the computing devices (164, 166, 168, 170). In the example of FIG. 1, writing data to the NVRAM device (148, 152) may be carried out more quickly than writing data to the storage device (146, 150). The storage array controller (106, 112) may be configured to effectively utilize the NVRAM devices (148, 152) as a quickly accessible buffer for data destined to be written to storage. In this way, the latency of write requests may be significantly improved relative to a system in which the storage array controller writes data directly to the storage devices (146, 150).

A 'storage device' as the term is used in this specification refers to any device configured to record data persistently. The term 'persistently' as used here refers to a device's ability to maintain recorded data after loss of a power source. Examples of storage devices may include mechanical, spinning hard disk drives, Solid-state drives (e.g., "Flash drives"), and the like.

The storage array controllers (106, 112) of FIG. 1 may be configured for preventing duplicate entries of identical data in a storage device according to various embodiments. The storage array controllers (106, 112) may prevent duplicate entries of identical data in a storage device by receiving a write request to write data to the storage device; calculating one or more signatures for the data associated with the write request; determining whether any of the calculated signatures match a calculated signature contained in a recently read signature buffer, each entry in the recently read signature buffer associating a calculated signature for data that has been read with an address of a storage location within the storage device where the data is stored; and responsive to determining that one of the calculated signatures matches a calculated signature contained in the recently read signature buffer, determining whether the data associated with the calculated signature is a duplicate of data stored at a particular address that is associated with the calculated signature contained in the recently read signature buffer, as will be described in greater detail below.

The arrangement of computing devices, storage arrays, networks, and other devices making up the example system illustrated in FIG. 1 are for explanation, not for limitation. Systems useful according to various disclosed embodiments may include different configurations of servers, routers, switches, computing devices, and network architectures, not shown in FIG. 1, as will occur to those of skill in the art.

Preventing duplicate entries of identical data in a storage device in accordance with the disclosed embodiments is generally implemented with computers. In the system of FIG. 1, for example, all the computing devices (164, 166, 168, 170) and storage controllers (106, 112) may be implemented to some extent at least as computers. For further explanation, therefore, FIG. 2 sets forth a block diagram of a storage array controller (202) useful for preventing duplicate entries of identical data in a storage device according to various embodiments.

Figure 2:
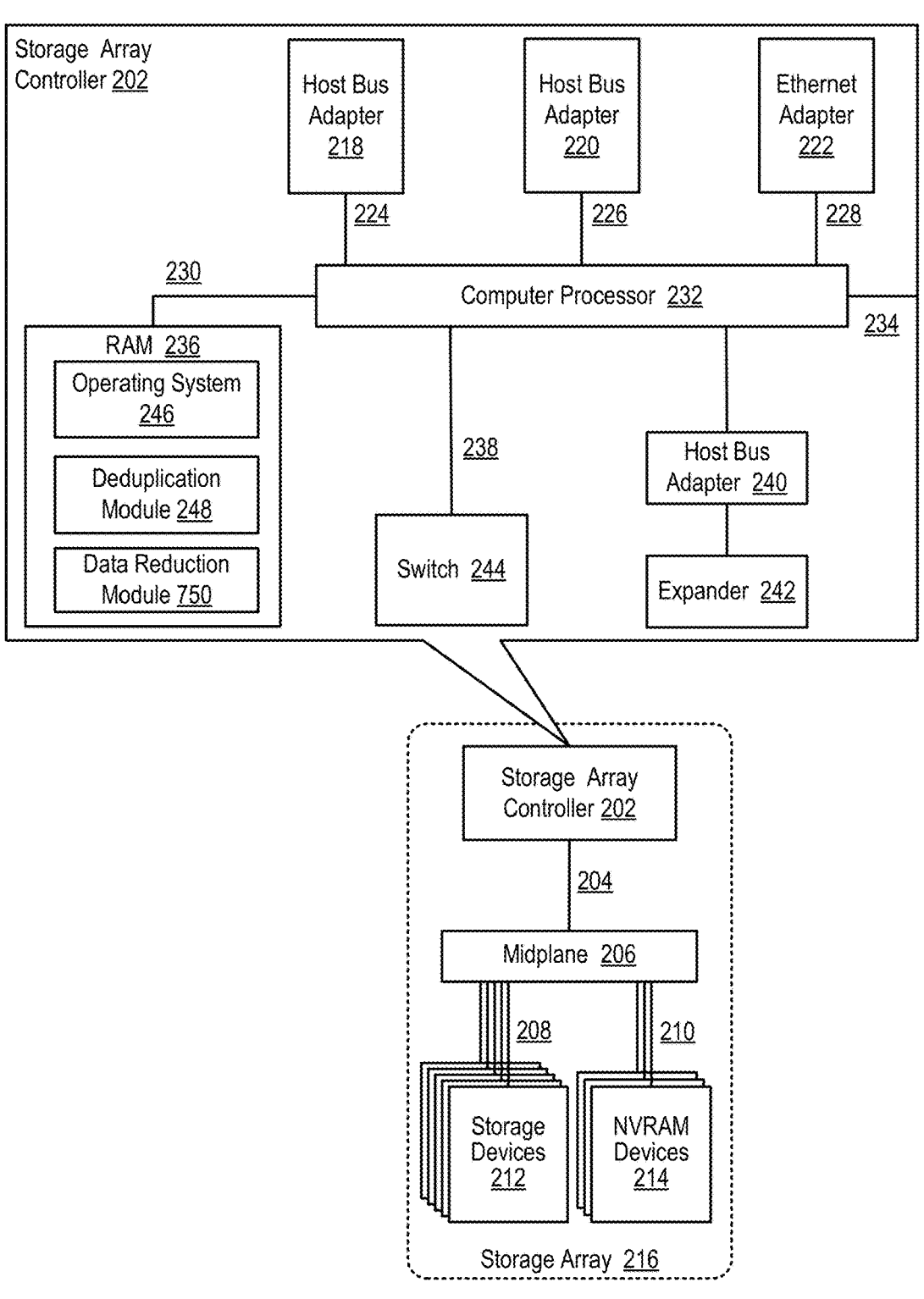
FIG. 2 sets forth a block diagram of an example storage array controller useful in preventing duplicate entries of identical data in a storage device according to various embodiments.

The storage array controller (202) of FIG. 2 is similar to the storage array controllers depicted in FIG. 1, as the storage array controller (202) of FIG. 2 is communicatively coupled, via a midplane (206), to one or more storage devices (212) and to one or more NVRAM devices (214) that are included as part of a storage array (216). The storage array controller (202) may be coupled to the midplane (206) via one or more data communications links (204) and the midplane (206) may be coupled to the storage devices (212) and the NVRAM devices (214) via one or more data communications links (208, 210). The data communications links (204, 208, 210) of FIG. 2 may be embodied, for example, as Peripheral Component Interconnect Express ('PCIe') bus.

The storage array controller (202) of FIG. 2 includes at least one computer processor (232) or 'CPU' as well as random access memory ('RAM') (236). The computer processor (232) may be connected to the RAM (236) via a data communications link (230), which may be embodied as a high speed memory bus such as a Double-Data Rate 4 ('DDR4') bus.

Stored in RAM (214) is an operating system (246). Examples of operating systems useful in storage array controllers (202) configured for preventing duplicate entries of identical data in a storage device according to various embodiments include UNIX™, Linux™, Microsoft Windows™, and others as will occur to those of skill in the art. Also stored in RAM (236) is an array management module (248), a module that includes computer program instructions for preventing duplicate entries of identical data in a storage device according to various embodiments. The functionality of the array management module (248) will be described in greater detail below, but readers will appreciate that while the array management module (248) and the operating system (246) in the example of FIG. 2 are shown in RAM (168), many components of such software may also be stored in non-volatile memory such as, for example, on a disk drive, on a solid-state drive, and so on.

The storage array controller (202) of FIG. 2 also includes a plurality of host bus adapters (218, 220, 222) that are coupled to the processor (232) via a data communications link (224, 226, 228). Each host bus adapter (218, 220, 222) may be embodied as a module of computer hardware that connects the host system (i.e., the storage array controller) to other network and storage devices. Each of the host bus adapters (218, 220, 222) of FIG. 2 may be embodied, for example, as a Fibre Channel adapter that enables the storage array controller (202) to connect to a SAN, as an Ethernet adapter that enables the storage array controller (202) to connect to a LAN, and so on. Each of the host bus adapters (218, 220, 222) may be coupled to the computer processor (232) via a data communications link (224, 226, 228) such as, for example, a PCIe bus.

The storage array controller (202) of FIG. 2 also includes a host bus adapter (240) that is coupled to an expander (242). The expander (242) depicted in FIG. 2 may be embodied as a module of computer hardware utilized to attach a host system to a larger number of storage devices than would be possible without the expander (242). The expander (242) depicted in FIG. 2 may be embodied, for example, as a SAS expander utilized to enable the host bus adapter (240) to attach to storage devices in an embodiment where the host bus adapter (240) is embodied as a SAS controller.

The storage array controller (202) of FIG. 2 also includes a switch (244) that is coupled to the computer processor (232) via a data communications link (238). The switch (244) of FIG. 2 may be embodied as a computer hardware device that can create multiple endpoints out of a single endpoint, thereby enabling multiple devices to share what was initially a single endpoint. The switch (244) of FIG. 2 may be embodied, for example, as a PCIe switch that is coupled to a PCIe bus (238) and presents multiple PCIe connection points to the midplane (206).

The storage array controller (202) of FIG. 2 also includes a data communications link (234) for coupling the storage array controller (202) to other storage array controllers. Such a data communications link (234) may be embodied, for example, as a QuickPath Interconnect ('QPI') interconnect.

Readers will recognize that these components, protocols, adapters, and architectures are for illustration only, not limitation. Such a storage array controller may be implemented in a variety of different ways, each of which is well within the scope of various embodiments of the disclosure.

Figure 3:
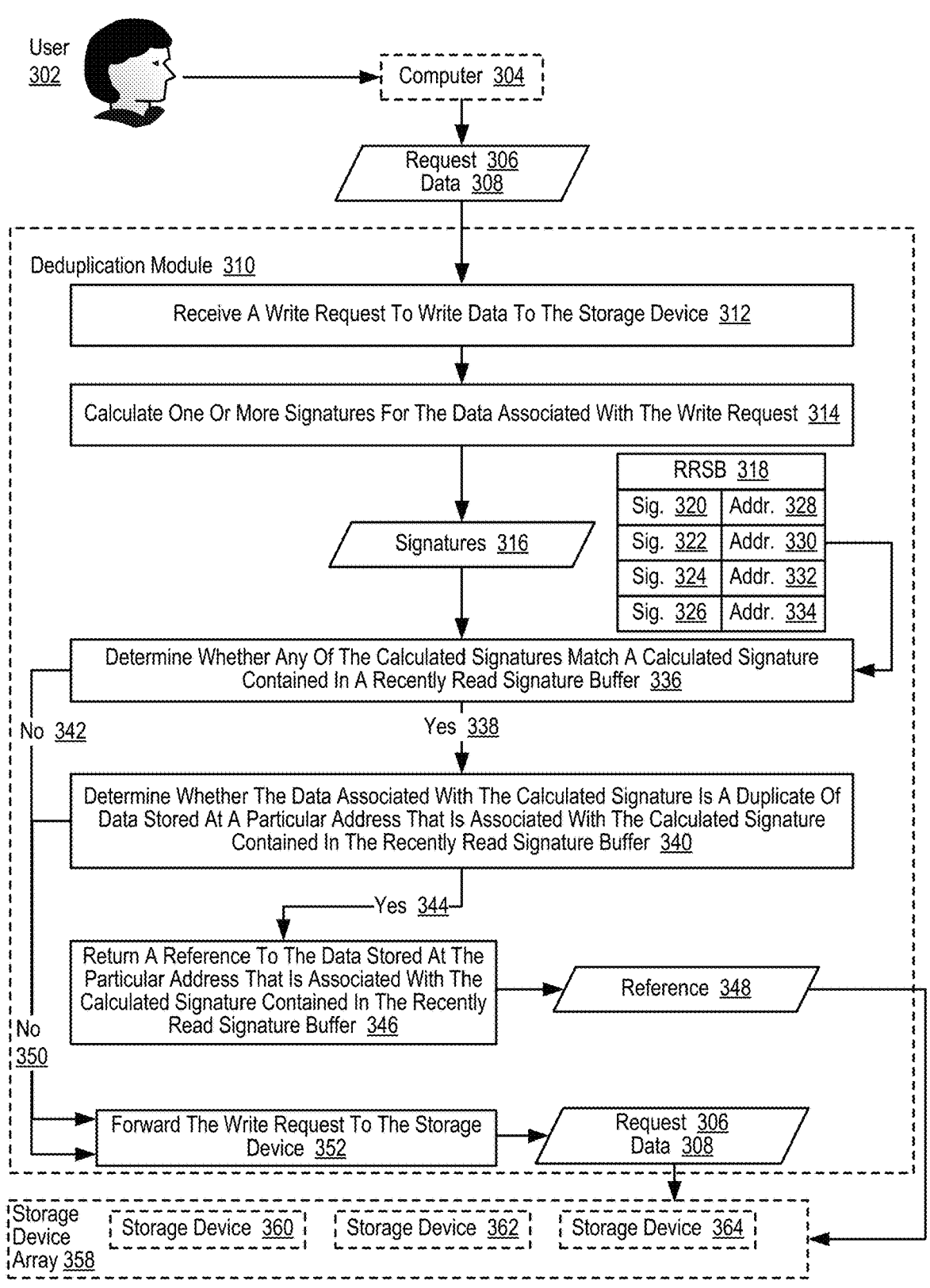
FIG. 3 sets forth a flow chart illustrating an example method for preventing duplicate entries of identical data in a storage device according to various embodiments.

For further explanation, FIG. 3 sets forth a flow chart illustrating an example method for preventing duplicate entries of identical data in a storage device (360, 362, 364) according to various embodiments. The storage devices (360, 362, 364) depicted in FIG. 3 may be embodied, for example, as SSDs that are included in an array of storage devices, depicted in FIG. 3 as a storage device array (358).

The example method depicted in FIG. 3 is carried out, at least in part, by a deduplication module (310). The deduplication module (310) depicted in FIG. 3 may be embodied, for example, as a module of computer program instructions executing on computer hardware such as a computer processor. The deduplication module (310) depicted in FIG. 3 may reside in memory that is contained in a storage array controller that is similar to the storage array controller described above with reference to FIG. 2.

The example method depicted in FIG. 3 includes receiving (312) a write request (306) to write data (308) to one or more of the storage devices (360, 362, 364) in an array (358) of storage devices. The write request (306) of FIG. 3 may be embodied, for example, as one or more messages received by a storage array controller that is executing the deduplication module (310). The one or more messages may include, for example, a first message to initiate the write process and one or more subsequent messages that include the data, all of which may be received by the storage array controller over a data communications network such as a SAN, a LAN, or any other data communications link. The write request (306) of FIG. 3 may include, for example, an identification of a device, file, object, other service to which the write request (306) is issued, an identification of a user or server that issued the write request (306), the data (308) that is to be written to the one or more of the storage devices (360, 362, 364), a reference to the data (308) that is to be written to the one or more of the storage devices (360, 362, 364), and any other information needed to service the write request (306).

The example method depicted in FIG. 3 also includes calculating (314) one or more signatures (316) for the data (308) associated with the write request (306). The one or more signatures (316) for the data (308) associated with the write request (306) represent identifiers of the data (308) that can be used to distinguish dissimilar data. Such a signature (316) may be embodied, for example, as a numeric value generated by applying a predetermined hash function to the data (308). Calculating (314) one or more signatures (316) for the data (308) associated with the write request (306) may therefore be carried out by applying one or more predetermined hash functions to the data (308) associated with the write request (306). That is, calculating (314) one or more signatures (316) for the data (308) associated with the write request (306) may be carried out by utilizing the data (308) as input to one or more predetermined hash functions, where the output of each hash function is a signature (316) for the data (308).

Readers will appreciate that multiple signatures (316) for the data (308) may be generated not only by applying multiple hash functions to the same data (308), but multiple signatures (316) for the data (308) may also be generated by applying one or more hash functions to different portions of the data (308). Consider an example in which the data (308) includes 4 kilobytes ('KBs'). In such an example, a hash function may be applied to all 4 KBs to generate a first signature, a hash function may be applied to the first 512 bytes only to generate a second signature, a hash function may be applied to the last 512 bytes only to generate a third signature, a hash function may be applied to a middle 512 bytes only to generate a fourth signature, and so on. Readers will appreciate that the decision to apply multiple hash functions to data, to segment the data into a plurality of portions (which may or may not overlap), or any combination thereof are all design decisions that are well within the scope of the present disclosure.

The example method depicted in FIG. 3 also includes determining (336) whether any of the calculated signatures (316) match a calculated signature (320, 322, 324, 326) contained in a recently read signature buffer (318). The recently read signature buffer (318) of FIG. 3 represents a data structure that associates a calculated signature (320, 322, 324, 326) for data that has been read with an address (328, 330, 332, 334) of a storage location within the storage device where the data is stored. As will be described in greater detail below, each time that a particular storage array controller reads data from a storage device (360, 362, 364), a deduplication module (310) executing on the storage array controller may calculate one or more signatures for the data read from a storage device (360, 362, 364) by applying the one or more predetermined hash functions referenced above to the data read from a storage device (360, 362, 364). Alternatively, in an embodiment where the storage device (360, 362, 364) calculates and stores one or more signatures for data stored by the storage devices (360, 362, 364), the deduplication module (310) executing on the storage array controller may retrieve the one or more signatures from the storage device (360, 362, 364) when the data is read from the storage device (360, 362, 364). Each of the one or more signatures for the data read from the storage device (360, 362, 364) may be stored in the recently read signature buffer (318) along with the address in the storage device (360, 362, 364) where the data is stored.

In the example method depicted in FIG. 3, determining (336) whether any of the calculated signatures (316) match a calculated signature (320, 322, 324, 326) contained in a recently read signature buffer (318) may be carried out, for example, by comparing the calculated signatures (316) for the data (308) associated with the write request (306) to each calculated signature (320, 322, 324, 326) contained in the recently read signature buffer (318). If the deduplication module (310) determines that the calculated signatures (316) for the data (308) associated with the write request (306) do not (342) match any of the a calculated signature (320, 322, 324, 326) contained in a recently read signature buffer (318), the deduplication module (310) can safely determine that the data (308) associated with the write request (306) is not a duplicate of any data that was recently read and whose signature was retained in the recently read signature buffer (318). If the deduplication module (310) determines that the calculated signatures (316) for the data (308) associated with the write request (306) does (338) match one or more of the calculated signatures (320, 322, 324, 326) contained in a recently read signature buffer (318), however, the deduplication module (310) can determine that the data (308) associated with the write request (306) may already be stored on the storage device (360, 362, 364).

If the deduplication module (310) determines that the calculated signatures (316) for the data (308) associated with the write request (306) does (338) match one or more of the a calculated signatures (320, 322, 324, 326) contained in a recently read signature buffer (318), the deduplication module (310) can determine (340) whether the data (308) associated with the calculated signature (316) is a duplicate of data stored at a particular address (328, 330, 332, 334) that is associated with the calculated signature (320, 322, 324, 326) contained in the recently read signature buffer (318). Determining (340) whether the data (308) associated with the calculated signature (316) is a duplicate of data stored at a particular address (328, 330, 332, 334) that is associated with the calculated signature (320, 322, 324, 326) contained in the recently read signature buffer (318) may be carried out, for example, by obtaining the data that is stored at the particular address (328, 330, 332, 334) that is associated with the calculated signature (320, 322, 324, 326) contained in the recently read signature buffer (318) and performing a bit-by-bit comparison of the retrieved data to the data (308) associated with the calculated signature (316).

Determining (340) whether the data (308) associated with the calculated signature (316) is a duplicate of data stored at a particular address (328, 330, 332, 334) that is associated with the calculated signature (320, 322, 324, 326) contained in the recently read signature buffer (318) can be carried out in response to affirmatively (338) determining that one of the calculated signatures (316) matches a calculated signature (320, 322, 324, 326) contained in the recently read signature buffer (318). Readers will appreciate that affirmatively (338) determining that one of the calculated signatures (316) matches a calculated signature (320, 322, 324, 326) contained in the recently read signature buffer (318) may only be indicative that the data (308) associated with the calculated signature (316) may be a duplicate of data stored at a particular address (328, 330, 332, 334) that is associated with the calculated signature (320, 322, 324, 326) contained in the recently read signature buffer (318). For example, if a particular hash function is used that is relatively weak, but relatively quick to perform, collisions may occur where distinct data results in the same hash value. As such, in order to definitively determine whether the data (308) associated with the calculated signature (316) is a duplicate of data stored at a particular address (328, 330, 332, 334) that is associated with the calculated signature (320, 322, 324, 326) contained in the recently read signature buffer (318), the data (308) associated with the calculated signature (316) and the data stored at a particular address (328, 330, 332, 334) that is associated with the calculated signature (320, 322, 324, 326) contained in the recently read signature buffer (318) must actually be compared.

In response to affirmatively (344) determining that the data (308) associated with the write request (306) is a duplicate of data stored at a particular address (328, 330, 332, 334) that is associated with the calculated signature (320, 322, 324, 326) contained in the recently read signature buffer (318), a reference (348) to the particular address (328, 330, 332, 334) is returned. The reference (348) to the particular address (328, 330, 332, 334) where data is stored that is a duplicate of the data (308) associated with the write request (306) may be embodied, for example, as a pointer to the particular address (328, 330, 332, 334) where data is stored that is a duplicate of the data (308) associated with the write request (306), as the particular address (328, 330, 332, 334) itself where data is stored that is a duplicate of the data (308) associated with the write request (306), and so on. In the example method depicted in FIG. 3, returning a reference (348) to the particular address (328, 330, 332, 334) can include storing the reference (348) to the particular address (328, 330, 332, 334) at a memory location where the data (308) associated with the write request (306) would have been stored, if not for the fact that a duplicate copy of the data (308) associated with the write request (306) was already stored in the storage device (360, 362, 364).

In response to determining that the data (308) associated with the write request (306) is not (350) a duplicate of data stored at a particular address (328, 330, 332, 334) that is associated with the calculated signature (320, 322, 324, 326) contained in the recently read signature buffer (318), the write request (306) is forwarded (352) to the storage device (360, 362, 364). The write request (306) may be forwarded (352) to the storage device (360, 362, 364) so that the storage device (360, 362, 364) can service the write request (306). Readers will appreciate that forwarding (352) the write request (306) to the storage device (360, 362, 364) does not necessarily result in the data (308) associated with the write request (306) being written to the storage device (360, 362, 364). The data (308) associated with the write request (306) may not ultimately be written to the storage device (360, 362, 364) because a controller or other form of computer logic may determine that some data, already stored in the storage device (360, 362, 364) but not reflected in the recently read signature buffer (318), matches the data (308) associated with the write request (306). Readers will further appreciate that the data (308) associated with the write request (306) may undergo further processing prior to forwarding (352) the write request (306) to the storage device (360, 362, 364). For example, the data (308) associated with the write request (306) may be compressed, encrypted, or otherwise processed according to various design decisions that are each within the scope of the present disclosure.

Although the example described above makes reference to preventing duplicate entries of identical data in a storage device (360, 362, 364), readers will appreciate that the steps described above can be applied to a single storage device and also applied to multiple storage devices, such as all of the storage devices (360, 362, 364) in the storage device array (358). Preventing duplicate entries of identical data across all storage devices (360, 362, 364) in the storage device array (358) may be carried out, for example, through the use of an addressing scheme where the addresses in each storage device (360, 362, 364) are unique, by associating a device identifier with the addresses (328, 330, 332, 334) stored in the recently read signature buffer (318) if the addresses in each storage device are not unique, and so on. Because the deduplication module (310) may reside on a storage array controller that facilitates accesses to all storage devices (360, 362, 364) in the storage device array (358), the deduplication module (310) may be configured to maintain a recently read signature buffer (318) that includes information describing data read from all storage devices (360, 362, 364) in the storage device array (358). In the event that redundant storage array controllers facilitate accesses to all storage devices (360, 362, 364) in the storage device array (358), the storage array controllers may be configured to communicate with each other to maintain a recently read signature buffer (318) that includes information describing data read from all storage devices (360, 362, 364) in the storage device array (358).

Figure 4:
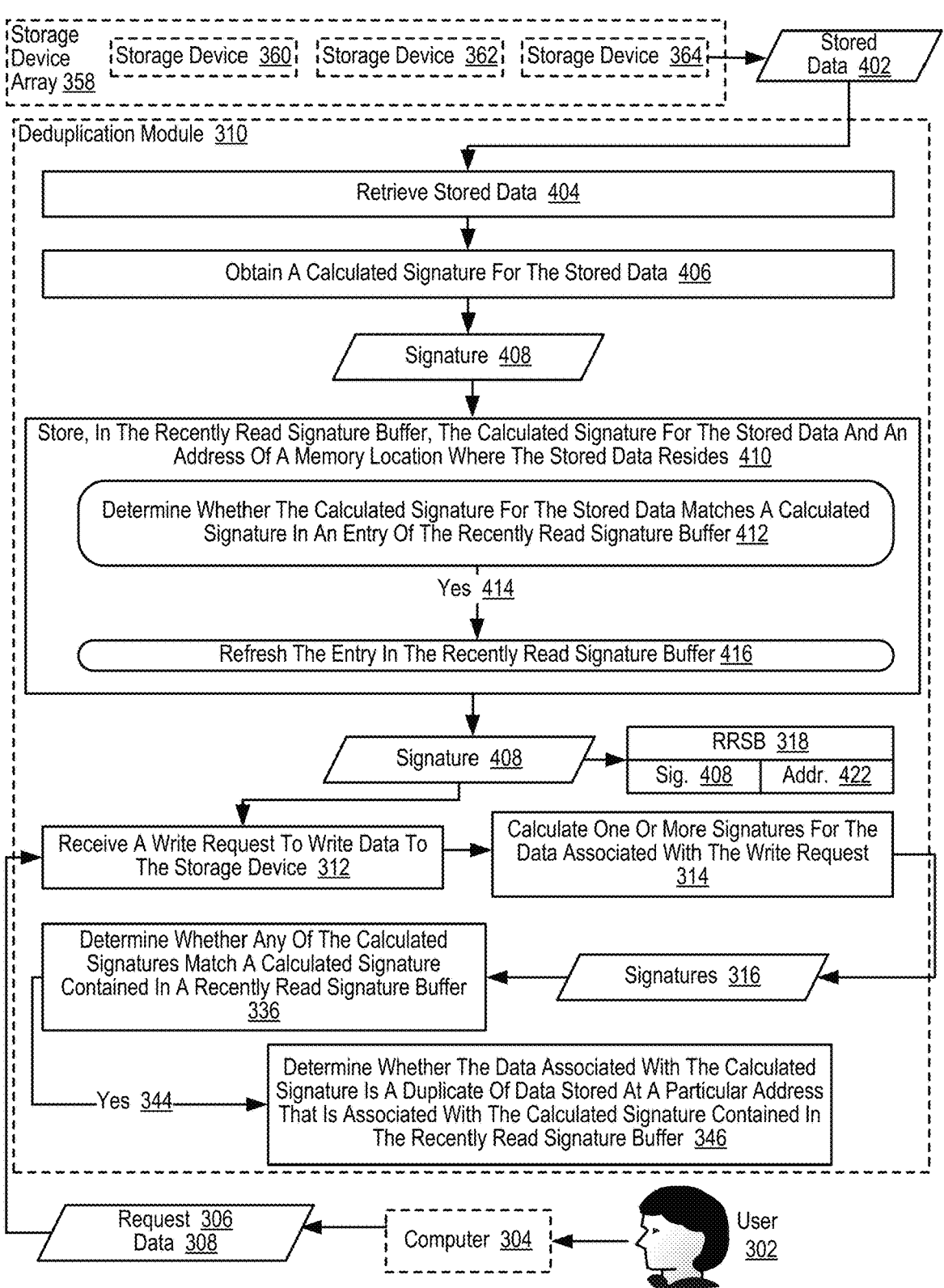
FIG. 4 sets forth a flow chart illustrating an additional example method for preventing duplicate entries of identical data in a storage device according to various embodiments.

For further explanation, FIG. 4 sets forth a flow chart illustrating an example method for preventing duplicate entries of identical data in a storage device according to various embodiments. The example method depicted in FIG. 4 is similar to the example method depicted in FIG. 3, as the example method depicted in FIG. 4 also includes receiving (312) a write request (306) to write data (308) to one or more of the storage devices (360, 362, 364) in an array (358) of storage devices, calculating (314) one or more signatures (316) for the data (308) associated with the write request (306), determining (336) whether any of the calculated signatures (316) match a calculated signature (408) contained in a recently read signature buffer (318), and determining (340) whether the data (308) associated with the calculated signature (316) is a duplicate of data stored at a particular address (422) that is associated with the calculated signature (408) contained in the recently read signature buffer (318).

The example method depicted in FIG. 4 also includes retrieving (404) stored data (402). The stored data (402) may be retrieved (404), for example, from one of the storage devices (360, 362, 364) in the array (358) of storage devices in response to a read request received by a storage array controller. Such a read request may include an identifier of the stored data (402) such as a file name, an address for the stored data (402), information identifying the user, computer, other entity, or logical, virtual, or physical storage device that issued the read request, or any other information needed to service the read request.

The example method depicted in FIG. 4 also includes obtaining (406) a calculated signature (408) for the stored data (402). Obtaining (406) a calculated signature (408) for the stored data (402) may be carried out, for example, by applying a predetermined hash function to the stored data (402). In such a way, the deduplication module (310) may calculate the signature (408) for the stored data (402). In an alternative embodiment, the signature (408) may be calculated by a storage array controller, by processing logic on one of the storage devices (360, 362, 364), or by some other entity, and stored in the storage device (360, 362, 364) along with the stored data (402) itself. In such an alternative embodiment, the calculated signature (408) for the stored data (402) may be obtained (406) by retrieving the calculated signature (408) for the stored data (402) from one of the storage devices (360, 362, 364) as part of retrieving (404) the stored data (402), and so on.

The example method depicted in FIG. 4 also includes storing (410), in the recently read signature buffer (318), the calculated signature (408) for the stored data (402) and an address (422) of a storage location on the storage device (360, 362, 364) where the stored data (402) resides. Storing (410) the calculated signature (408) for the stored data (402) and an address (422) of a storage location on the storage device (360, 362, 364) where the stored data (402) resides may be carried out, for example, by: removing an entry from the recently read signature buffer (318) and replacing the removed entry with the calculated signature (408) for the stored data (402) and the address (422) for the stored data (402); identifying an empty or outdated entry in the recently read signature buffer (318) and replacing the empty or outdated entry with the calculated signature (408) for the stored data (402) and the address (422) for the stored data (402); and in other ways as will occur to readers of skill in the art. Readers will appreciate that each time that stored data (402) is read from one of the storage devices (360, 362, 364), the calculated signature (408) and the address (422) for the stored data (402) may be stored (410) in the recently read signature buffer (318) such that entries in the recently read signature buffer (318) remain current. Readers will further appreciate the calculated signature (408) and the address (422) for the stored data (402) may be stored (410) in the recently read signature buffer (318) for only a subset of the times that stored data (402) is read from one of the storage devices (360, 362, 364) in accordance with embodiments described herein.

In the example method depicted in FIG. 4, storing (410) the calculated signature (408) for the stored data (402) and the address (422) of the stored data (402) in the recently read signature buffer (318) can include determining (412) whether the calculated signature (408) for the stored data (402) matches a calculated signature in an entry of the recently read signature buffer (318). In order to avoid creating duplicate entries in the recently read signature buffer (318), the deduplication module (310) may determine (412) whether the calculated signature (408) for the stored data (402) matches a calculated signature in an entry of the recently read signature buffer (318).

In response to affirmatively (414) determining that the calculated signature (408) for the stored data (402) matches calculated signature in an entry of the recently read signature buffer (318), the entry in the recently read signature buffer (318) may be refreshed (416). Refreshing (416) the entry in the recently read signature buffer (318) that matches the calculated signature (408) for the stored data (402) may be carried out, for example, by updating a timestamp identifying the time at which the stored data (402) was retrieved (404) in response to a read request. In an alternative embodiment where the recently read signature buffer (318) is sorted, for example, such that older entries appear at the front of the recently read signature buffer (318) and newer entries appear at the back recently read signature buffer (318), refreshing (416) the entry in the recently read signature buffer (318) that matches the calculated signature (408) for the stored data (402) may be carried out by moving the entry to a location within the recently read signature buffer (318) that is designated for newer entries. Readers will appreciate that the recently read signature buffer (318) may be organized in other ways and that refreshing (416) the entry in the recently read signature buffer (318) that matches the calculated signature (408) for the stored data (402) may be carried in accordance with any corresponding organization policy. Furthermore, refreshing (416) the entry in the recently read signature buffer (318) that matches the calculated signature (408) for the stored data (402) might only be carried out for a subset of situations in which the calculated signature (408) for the stored data (402) is affirmatively (414) determined to match a calculated signature in an entry of the recently read signature buffer (318), as retaining the original signature may be preferable in certain circumstances.

Figure 5:
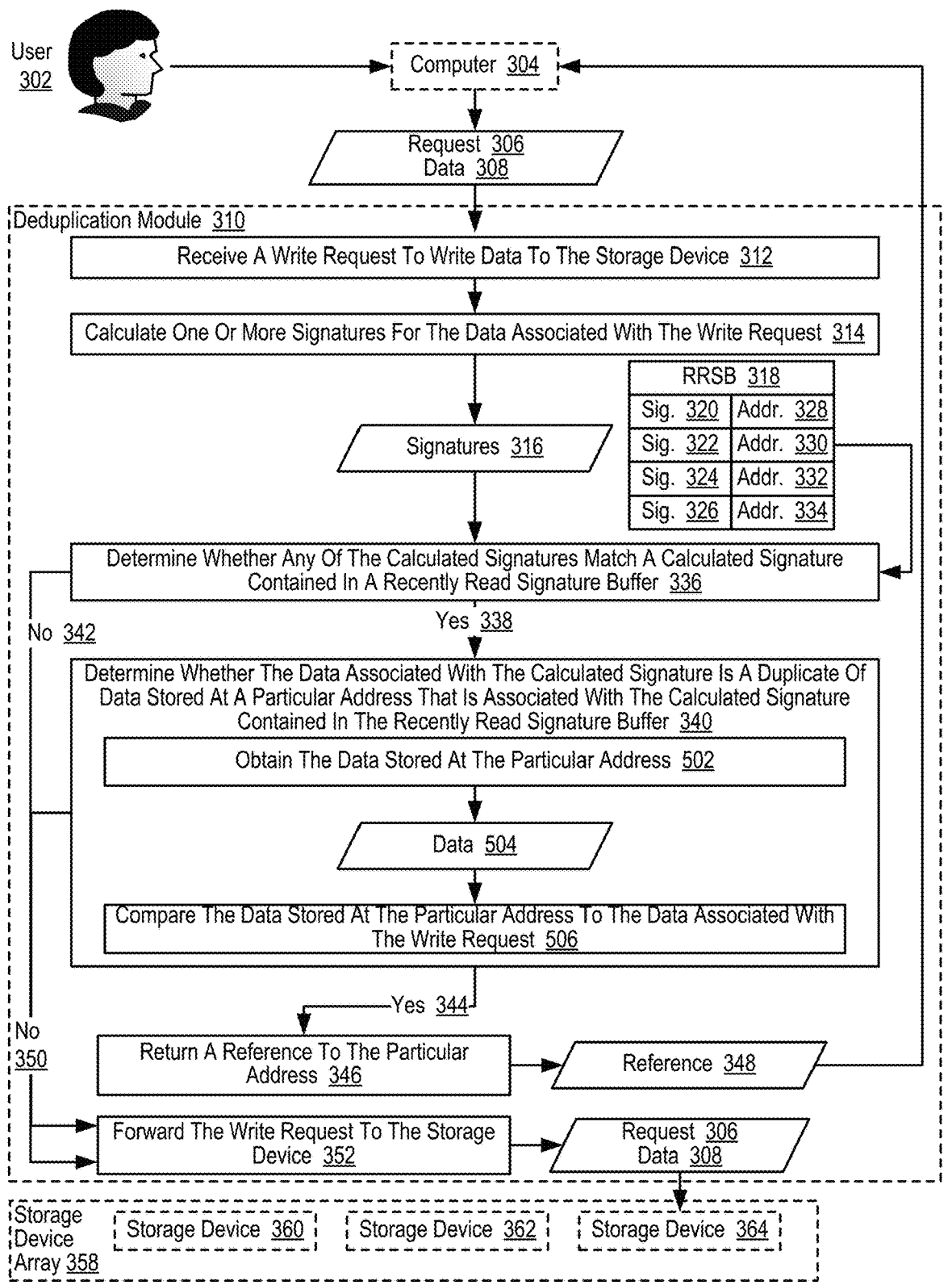
FIG. 5 sets forth a flow chart illustrating an additional example method for preventing duplicate entries of identical data in a storage device according to various embodiments.

For further explanation, FIG. 5 sets forth a flow chart illustrating an example method for preventing duplicate entries of identical data in a storage device according to various embodiments. The example method depicted in FIG. 5 is similar to the example method depicted in FIG. 3, as the example method depicted in FIG. 5 also includes receiving (312) a write request (306) to write data (308) to one or more of the storage devices (360, 362, 364) in an array (358) of storage devices, calculating (314) one or more signatures (316) for the data (308) associated with the write request (306), determining (336) whether any of the calculated signatures (316) match a calculated signature (320, 322, 324, 326) contained in a recently read signature buffer (318), and determining (340) whether the data (308) associated with the calculated signature (316) is a duplicate of data stored at a particular address (328, 330, 332, 334) that is associated with the calculated signature (320, 322, 324, 326) contained in the recently read signature buffer (318).

In the example method depicted in FIG. 5, determining (340) whether the data (308) associated with the calculated signature (316) is a duplicate of data stored at a particular address (328, 330, 332, 334) that is associated with the calculated signature (320, 322, 324, 326) contained in the recently read signature buffer (318) can include obtaining (502) the data (504) stored at the particular address (328, 330, 332, 334). Obtaining (502) the data (504) stored at the particular address (328, 330, 332, 334) may be carried out, for example, by reading the data (504) from the storage device (360, 362, 364) using the particular address (328, 330, 332, 334). In an alternative embodiment, a cache may exist to temporarily store data that is read from one of the storage devices and associated with an entry in the recently read signature buffer (318). For example, the first entry in the recently read signature buffer (318) of FIG. 1 includes a signature (320) for recently read data and the address (328) at which the recently read data is stored. In such an example, the recently read data itself may be stored in the cache, such that obtaining (502) the data (504) stored at the particular address (328) may be carried out by retrieving the data (504) from the cache.

In the example method depicted in FIG. 5, determining (340) whether the data (308) associated with the calculated signature (316) is a duplicate of data stored at a particular address (328, 330, 332, 334) that is associated with the calculated signature (320, 322, 324, 326) contained in the recently read signature buffer (318) can also include comparing (506) the data (504) stored at the particular address (328, 330, 332, 334) to the data (308) associated with the write request (306). By performing an actual comparison (506) of the data (504) stored at the particular address (328, 330, 332, 334) to the data (308) associated with the write request (306), a definitive determination can be made as to whether the data (504) stored at the particular address (328, 330, 332, 334) and the data (308) associated with the write request (306) are duplicates. Readers will appreciate that the mere fact that the signature for the data (504) stored at the particular address (328, 330, 332, 334) matches the signature for the data (308) associated with the write request (306), does not necessarily mean that the data (504) stored at the particular address (328, 330, 332, 334) is a duplicate of the data (308) associated with the write request (306). That is, matching signatures may occasionally be generated from dissimilar data as some hash functions may occasionally result in collisions. The strength of a hash function may be increased to reduce or eliminate such collisions, but a design decision may be made to utilize a weaker hash function which requires less time and computing resources to apply. Furthermore, a weaker hash function may also result in a smaller hash value, thereby requiring less space to store and enabling more signatures to be stored in a given space, relative to a stronger hash function. With all hash functions, however, applying the same hash function to identical data will produce the same signatures.

For further explanation, FIG. 6 sets forth a flow chart illustrating an example method for preventing duplicate entries of identical data in a storage device according to various embodiments. The example method depicted in FIG. 6 is similar to the example method depicted in FIG. 3, as the example method depicted in FIG. 6 also includes receiving (312) a write request (306) to write data (308) to one or more of the storage devices (360, 362, 364) in an array (358) of storage devices, calculating (314) one or more signatures (316) for the data (308) associated with the write request (306), determining (336) whether any of the calculated signatures (316) match a calculated signature (320) contained in a recently read signature buffer (318), and determining (340) whether the data (308) associated with the calculated signature (316) is a duplicate of data stored at a particular address (328) that is associated with the calculated signature (320) contained in the recently read signature buffer (318).

The example method depicted in FIG. 6 also includes identifying (602), in dependence upon predetermined removal rules, one or more entries to remove from the recently read signature buffer (318). The predetermined removal rules may specify a removal policy for the recently read signature buffer (318) such as a policy to remove an entry in the recently read signature buffer (318) that is associated with the least recently read data, or a policy to remove an entry in the recently read signature buffer (318) that includes an address (328) that has been written to since being added to the recently read signature buffer (318), and so on. Readers will appreciate that predetermined removal rules may specify other removal policies and that identifying (602) one or more entries to remove from the recently read signature buffer (318) in accordance with such predetermined removal rules.

The example method depicted in FIG. 6 also includes removing (604) the one or more entries from the recently read signature buffer (318). Removing (604) the one or more entries from the recently read signature buffer (318) may be carried out, for example, by deleting the one or more entries from the recently read signature buffer (318), by overwriting the one or more entries from the recently read signature buffer (318) to include new entries, and so on.

In the example method depicted in FIG. 6, determining (340) whether the data (308) associated with the calculated signature (316) is a duplicate of data stored at a particular address (328) that is associated with the calculated signature (320) contained in the recently read signature buffer (318) can include comparing (606) the data associated with the calculated signature to data stored in a cache that is associated with information contained in the recently read signature buffer (318). The cache may be embodied, for example, as a general purpose cache that temporarily stores data that is read from one of the storage devices and associated with an entry in the recently read signature buffer (318). In such an example, the recently read data itself may be stored in the cache, such that obtaining the data stored at the particular address (328) included in the recently read signature buffer (318) may be carried out by retrieving the data from the cache.

The example method depicted in FIG. 6 illustrates an embodiment where identifying (602) one or more entries to remove from the recently read signature buffer (318) and removing (604) the one or more entries from the recently read signature buffer (318) are included as part of a larger process that includes receiving (312) a write request (306), determining (336) whether any of the calculated signatures (316) match a calculated signature (320) contained in a recently read signature buffer (318), and determining (340) whether the data (308) associated with the calculated signature (316) is a duplicate of data stored at a particular address (328) that is associated with the calculated signature (320) contained in the recently read signature buffer (318). Readers will appreciate, however, that identifying (602) one or more entries to remove from the recently read signature buffer (318) and removing (604) the one or more entries from the recently read signature buffer (318) may be carried out as isolated steps whose occurrence is not contingent upon the occurrence of the remaining steps depicted in FIG. 6. In other words, entries may be removed from the recently read signature buffer (318) as part of an independent process, without immediately or even eventually receiving (312) a write request (306) and performing the remaining steps depicted in FIG. 6.

Figure 7:
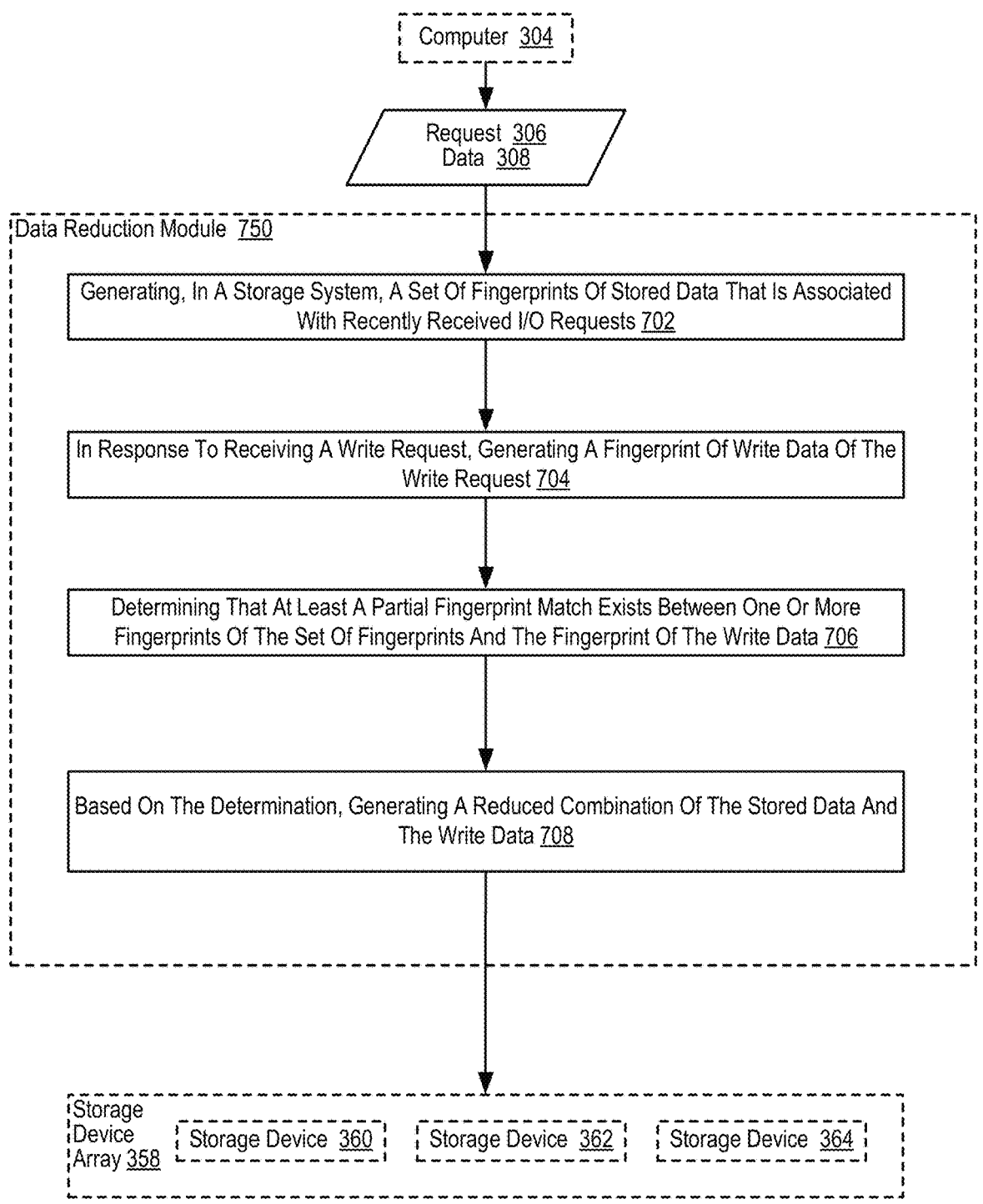
FIG. 7 sets forth a flow chart illustrating an example method of detecting modifications to recently stored data according to various embodiments of the disclosure.

FIG. 7 sets forth a flow chart illustrating an example method of detecting modifications to recently stored data. The example method depicted in FIG. 7 may be implemented using one or more components of storage arrays 102 or 104. For example, in some embodiments, the example method depicted in FIG. 7 may be implemented by components such as storage controller 106 or 112 of FIG. 1 or storage array controller 202 of FIG. 2. The logic of the method of FIG. 7 may be included in data reduction module 750, or otherwise. Additionally, the logic, algorithms, and control mechanisms described herein may comprise hardware and/or software.

The example method depicted in FIG. 7 includes generating 702, in a storage system, a set of fingerprints of stored data that is associated with recently received I/O requests. Generating 702, in a storage system, a set of fingerprints of stored data that is associated with recently received I/O requests can be carried out, for example, by data reduction module 750. Generating the set of fingerprints can include, for example, generating similarity-based or similarity-style sketches of data that was stored on the storage system. The term 'storage system', as used herein, can refer to one or more of storage arrays 102 or 104. The term 'stored data' as used herein, refers to data that was stored or modified on the storage system as a result of an I/O operation. For example, a write I/O operation received from computing devices 164, 166, 168, or 170 can include data to be written to a data structure, segment, volume, or other data object in a storage system such as one or more of storage arrays 102 or 104. As another example, the term 'stored data' can also refer to data that was previously stored on the storage system but modified by some I/O operation. The stored data can be stored using one or more different storage implementations, including using block storage, file storage, object stores, or databases. In some embodiments, data objects or items that are written or modified by I/O operations can be tagged or identified using some identifier to associate these data objects with the operation that acted on the data to store or modify it. As a result, a record of such data objects as indexed by the associated operations can be created.

Furthermore, generating a fingerprint of such stored data can include generating a fingerprint for data objects that correspond to some number or proportion of recent I/O operations. Generating a set of fingerprints of stored data that is associated with recently received I/O requests can pertain to different types of recently received I/O requests. The recently received I/O requests can include read requests or write requests. The recently received I/O requests can include I/O requests that were received within a threshold amount of time prior to a current time. In some embodiments, data associated with the last 10 I/O operations, or the last 5% of I/O operations, or some other set of I/O operations can be considered for generating fingerprints of the stored data. Readers will appreciate that the set of I/O operations— associated with stored data—for which the set of fingerprints is generated can be determined using other criteria. For example, operations associated with a certain application, or user, or storage system process can be considered the set of I/O operations and their associated data objects are processed using fingerprinting or other similar algorithms or methods to generate the fingerprints.

Generating a set of fingerprints of stored data can include generating a set of hash values for the data using one of one or more algorithms such as the Rabin-Karp rolling hash algorithm. Readers will appreciate that such algorithms can be used to generate hashes for different granularity levels for a data object. In one embodiment, a rolling hash based on some hash string length may be generated for strings of a data block. A deterministic subset of the hash values may be retained for later comparison purposes. For example, hash values generated for stored data using a rolling hash algorithm can be compared to other hash values that are generated for incoming write data using the same rolling hash algorithm.

Readers will appreciate that a rolling hash as described above can, for example, reliably locate common portions of some length from two different blocks of data, simply by preserving a well-defined subset of the hashes of each block and then comparing those few preserved hashes For example, this method could be used to detect common portions between a stored 4K block or data object and another 4K block from write data that is to be written to the storage system. The subset of hash values can be referred to as a fingerprint. Readers will appreciate that the fingerprint may be a small percentage of the full set of hash values, such as 2% or 5% of the set of hash values. Moreover, in some embodiments, the hash values may be sorted numerically, and the numerically lowest 2-5% of hash values can be retained for a data object and compared to the numerically lowest 2-5% of hash values for another data object. It should be understood that the lowest 2-5% of hash values is simply an example. Any means to slice a predictable range of hash values can suffice to retain a suitable subset of multiple rolling hash values for matching with strings of other blocks.

In one embodiment, hash generation for a data object can be performed when the data object is first received or ingested. For example, hash generation for a data object can be performed immediately on receipt of the data object before storing the data. Alternatively, hash generation for a data object can be performed at a later time after receipt of the data object, such as after storing the data. As another example, hash generation for a data object can be performed in response to a request or other trigger. For example, a hash of a stored data object can be generated in response to receipt of a data object (e.g., as part of a write) to which the stored data object is to be compared.

The example method depicted in FIG. 7 also includes generating 704, in response to receiving a write request, a fingerprint of write data of the write request. Generating 704 a fingerprint of write data of the write request can be carried out by generating a plurality of hash values for write data of an incoming write request. The plurality of hash values can be generated using the same hashing algorithm as was used for generating hash values for stored data. For example, if the Rabin-Karp rolling hash algorithm was used to generate hash values for one or more stored data items that were associated with recently received I/O requests, then the Rabin-Karp rolling hash algorithm can be used to generate the plurality of hash values for write data of an incoming write request. Moreover, the same granularity level can be used for hashing the write data of the incoming write request as was used for the stored data.

The example method depicted in FIG. 7 also includes determining 706 that at least a partial fingerprint match exists between one or more fingerprints of the set of fingerprints and the fingerprint of the write data. Determining 706 that at least a partial fingerprint match exists between one or more fingerprints of the set of fingerprints and the fingerprint of the write data can include comparing fingerprints (e.g., some subset of hash values) for write data of an incoming write request with one or more fingerprints for one or more stored data objects (e.g., some subset of hash values of stored data objects). As described earlier, the use of techniques that involve hashing at a certain granularity level can result in fingerprints for data objects that can be compared to determine similarity between data objects that have small differences between them. Using these techniques, a fingerprint generated for a stored data object can be compared to another fingerprint for a data object that is part of, for example, an incoming write request, in order to determine a match or partial match. In some embodiments, data reduction module 750 can be configured to define a level of similarity at which a partial match is determined between a stored data object and an incoming data object using a similarity sketch method. In one embodiment, a similarity sketch can determine that at least one particular common portion is present somewhere in two data objects, such as a data object from incoming write data versus a stored data object. More specifically, data reduction module 750 can identify that at least one of the rolling hashes in one data object matches at least one rolling hash preserved from another data object. Based on that, data reduction module 750 can determine that a partial fingerprint match exists for the stored data object and the incoming data object. Moreover, data reduction module 750 can determine that, based on the partial fingerprint match, the stored data object and the incoming data object are similar enough that they can be, for example, compressed together.

The example method depicted in FIG. 7 also includes generating 708, based on the determination, a reduced combination of the stored data and the write data. Generating 708 a reduced combination of the stored data and the write data based on the determination can include, for example, compressing together a stored data object and an incoming data object for which a partial fingerprint match exists as described above. Compressing together the stored data object and the incoming data object can include use of one of one or more compression algorithms such as Huffman coding, LZ77, run length encoding, or other compression algorithms.

Generating the reduced combination can also include performing deduplication using the stored data and the incoming write data. For example, if some blocks are determined to be identical between the stored data and the incoming write data, the combination of these data can be deduplicated and the result can be stored in place of the stored data, or the new data can simply reference data at location where the write data was previously stored, or in some other location in the storage system. Moreover, in some embodiments, deduplication can be performed inline, as the incoming write data is ingested. In other embodiments, the incoming write data may be initially stored in one or more NVRAM devices 148, 152, or 214 and then deduplicated with the stored data. Furthermore, deduplication (whether inline, post-NVRAM storage, or otherwise) can be performed where the incoming write data is deduplicated with stored data that was recently read, recently written, or with both recently read or recently written data.

Figure 8:
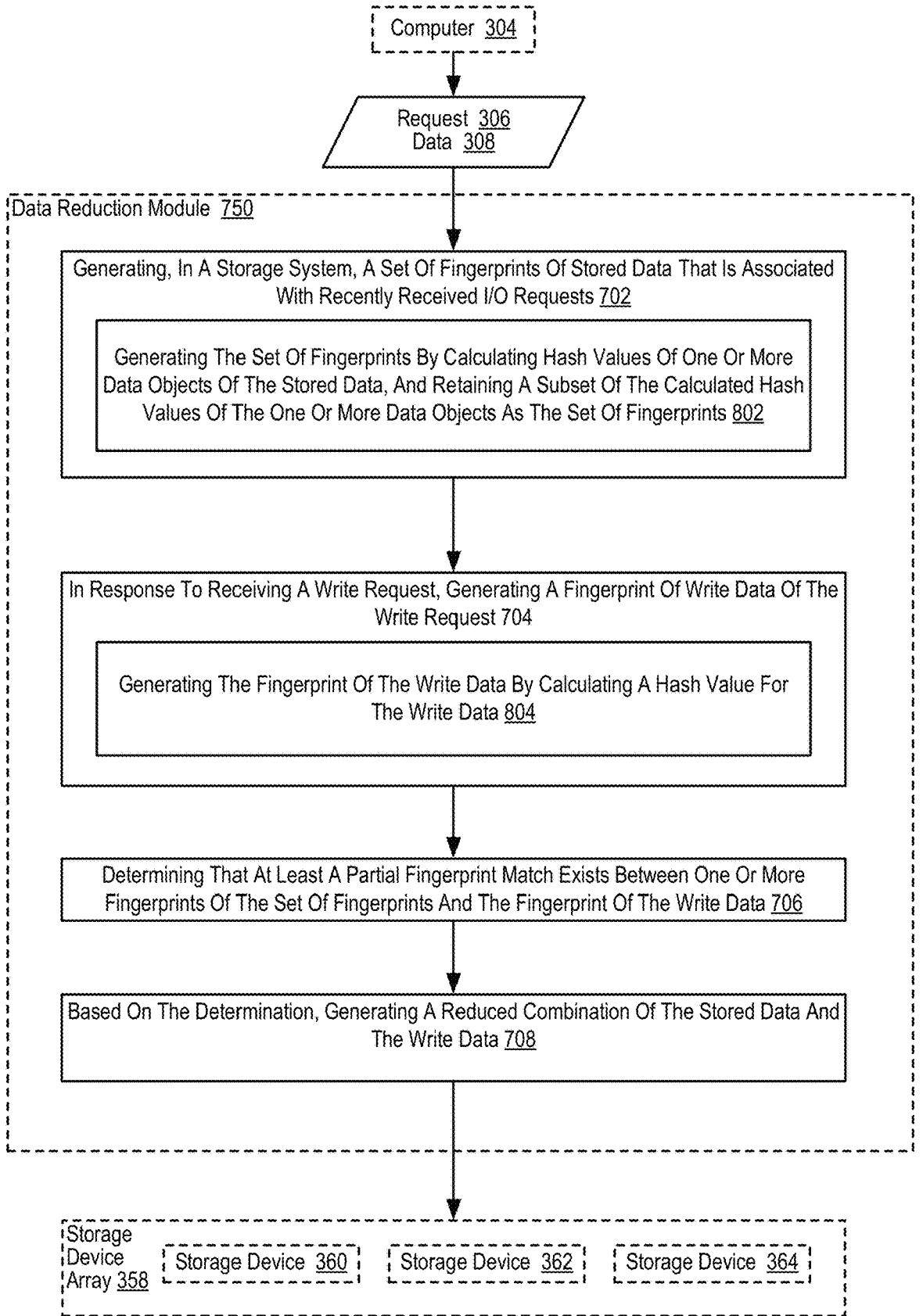
FIG. 8 sets forth a flow chart illustrating an example method of detecting modifications to recently stored data according to various embodiments of the disclosure.

FIG. 8 sets forth a flow chart illustrating an example method of detecting modifications to recently stored data according to various embodiments of the disclosure. The example method depicted in FIG. 8 is similar to the example method depicted in FIG. 7, as the example method depicted in FIG. 8 also includes generating 702, in a storage system, a set of fingerprints of stored data that is associated with recently received I/O requests, in response to receiving a write request, generating 704 a fingerprint of write data of the write request, determining 706 that at least a partial fingerprint match exists between one or more fingerprints of the set of fingerprints and the fingerprint of the write data and, based on the determination, generating 708 a reduced combination of the stored data and the write data.

The example method depicted in FIG. 8 differs from the example method depicted in FIG. 7 in that the example method depicted in FIG. 8 includes generating 802 the set of fingerprints by calculating hash values of one or more data objects of the stored data, and retaining a subset of the calculated hash values of the one or more data objects as the fingerprint. Here, stored data can refer to multiple data objects that are stored in storage device array 358. Generating 802 a set of fingerprints by calculating a set of hash values of data objects of the stored data can be carried out by iterating through a stored data object at a particular level of granularity, for example by executing the algorithm on blocks, of the stored data object, of a fixed size. For example, calculating the set of hash values of the data objects can be carried out by hashing strings of the stored data object to generate a plurality of hash values for the data object. This process can be carried out on some or all of the stored data objects. As mentioned earlier, the hashing can be carried out each time a data object is received, and the hash values can be stored at that point.

Retaining a subset of the set of hash values as the fingerprint can include retaining some of the stored hash values or, in other words, retaining hash values for some of the data objects for which hash values were generated. In one embodiment, hash values can be retained for data objects received within some number or percentage of the last received I/O operations (e.g., the last 10 I/O requests, or the last 5% of I/O requests). Moreover, hash values can also be deleted for data objects that are deleted or marked for garbage collection, since deleted or garbage collected data objects may not be compared to newly received data objects for purposes of detecting modifications or duplicates or for identifying data that can be compressed with other similar data.

The example method depicted in FIG. 8 also includes generating 804 the fingerprint of the write data by calculating hash values for the write data. This can include generating 804 the fingerprint of the write data by calculating a second set of hash values of strings of the write data such as by calculating hash values for the write data using the same algorithm as that used to generate hash values for the stored data objects. Moreover, the same data granularity level for hashing can be used when calculating hash values for the write data. Readers will appreciate that the stored data or the write data can be hashed more than once using different algorithms or different data granularity levels.

Figure 9:
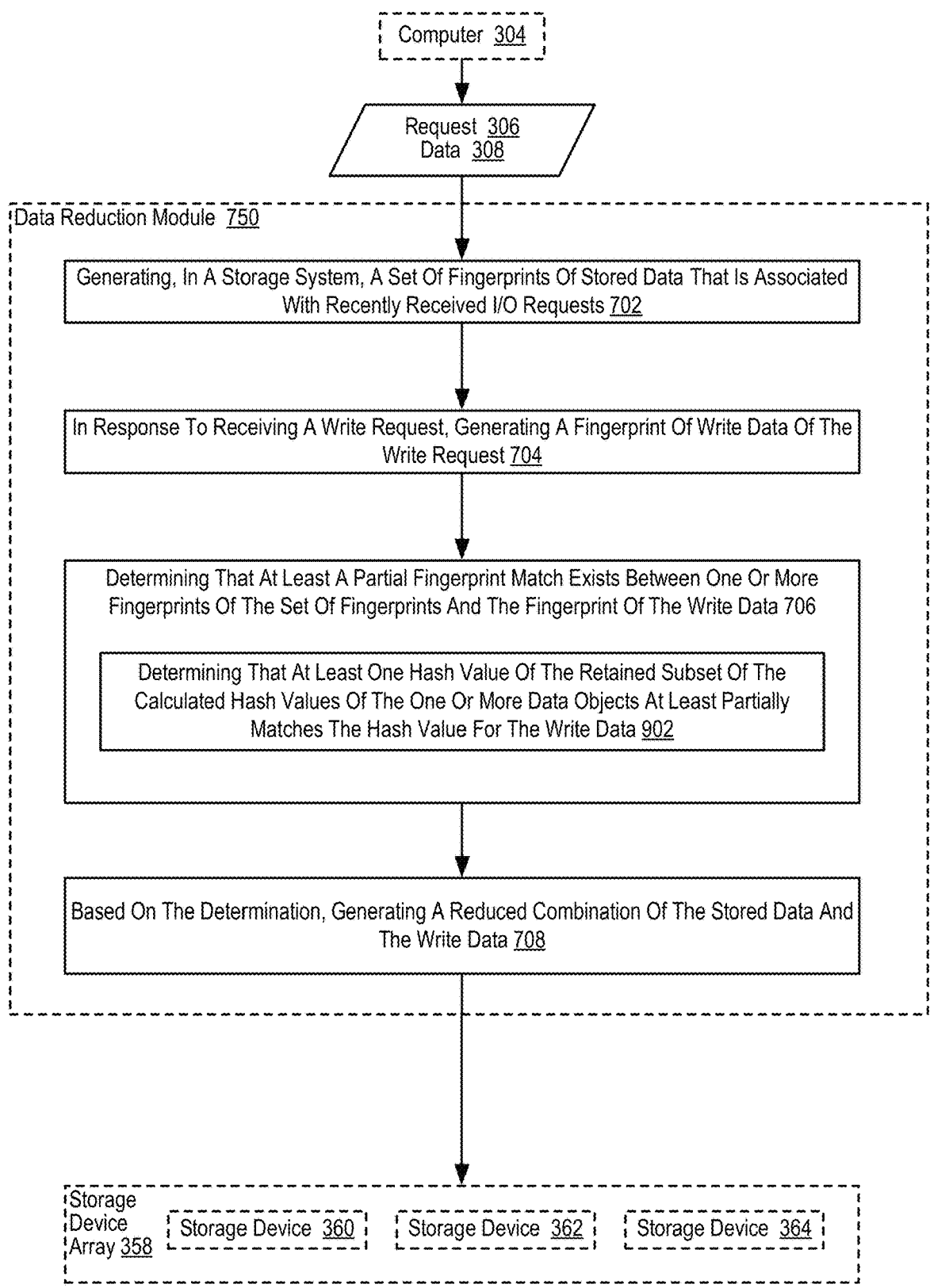
FIG. 9 sets forth a flow chart illustrating an example method of detecting modifications to recently stored data according to various embodiments of the disclosure.

FIG. 9 sets forth a flow chart illustrating an example method of detecting modifications to recently stored data according to various embodiments of the disclosure. The example method depicted in FIG. 9 is similar to the example method depicted in FIG. 7, as the example method depicted in FIG. 9 also includes generating 702, in a storage system, a set of fingerprints of stored data that is associated with recently received I/O requests, in response to receiving a write request, generating 704 a fingerprint of write data of the write request, determining 706 that at least a partial fingerprint match exists between one or more fingerprints of the set of fingerprints and the fingerprint of the write data and, based on the determination, generating 708 a reduced combination of the stored data and the write data.

The example method depicted in FIG. 9 differs from the example method depicted in FIG. 7 in that the example method depicted in FIG. 9 also includes that determining that at least a partial fingerprint match exists includes determining 902 that at least one hash value of the retained subset of the calculated hash values of the one or more data objects at least partially matches the hash value for the write data. Determining 902 that at least one hash value of the retained subset of the calculated hash values of the one or more data objects at least partially matches the hash value for the write data can include comparing one or more hash values from the retained subset of calculated hash values to the hash value for the write data. In one embodiment, data reduction module 750 can be configured to determine that a partial match exists if some defined proportion or percentage of the hash values are identical to each other. While an exact match is not sought, readers will appreciate that even though there is not an exact match, similarity up to a certain threshold can indicate that the write data represents a slight modification to the already-stored data object. The partial hash match as described above can serve to identify the stored data object that was recently stored. Given the partial hash match, the write data can be determined to be similar enough to the stored data object so that the write data and the stored data object can be efficiently reduced together (e.g., compressed together).

Figure 10:
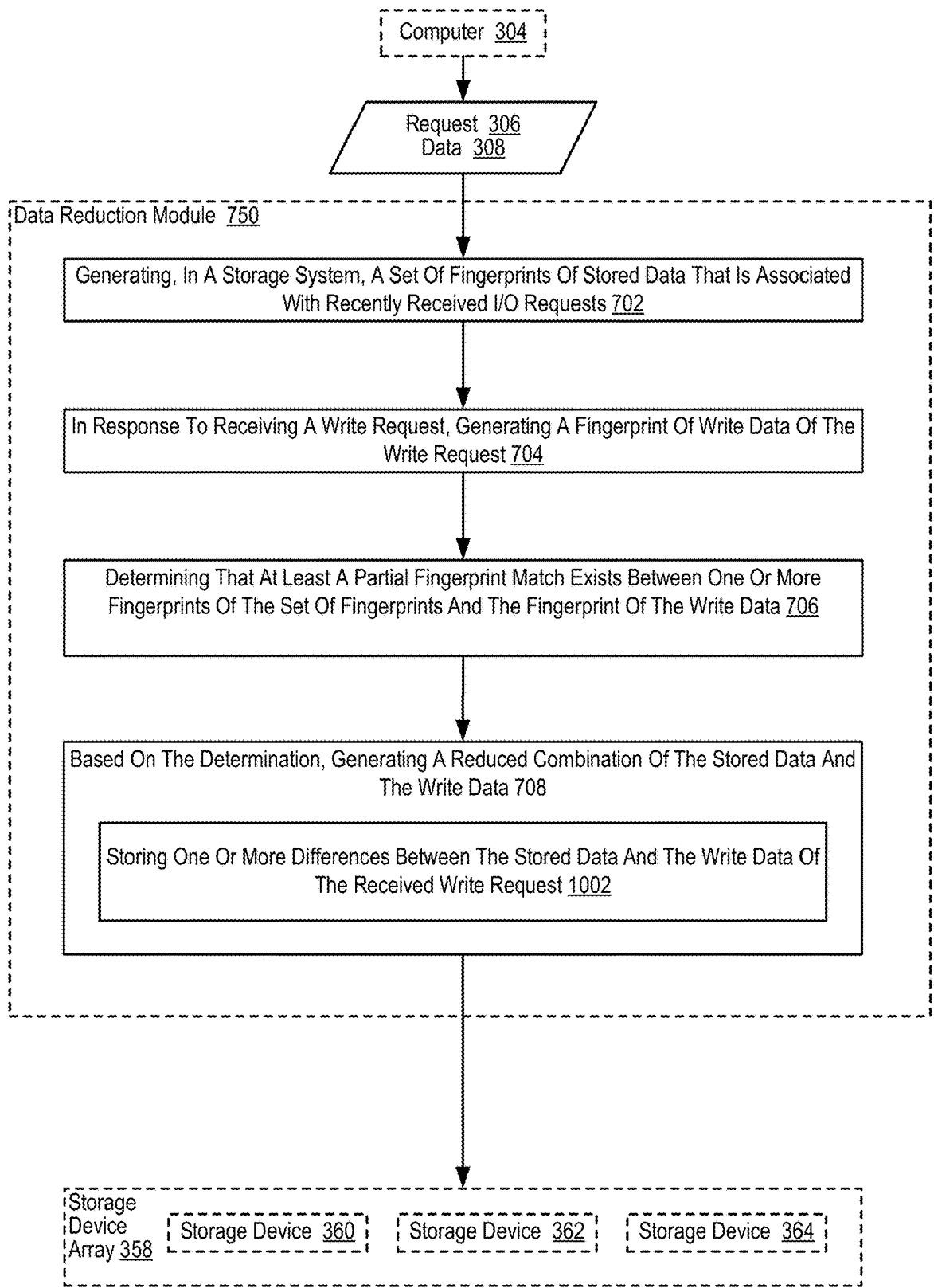
FIG. 10 sets forth a flow chart illustrating an example method of detecting modifications to recently stored data according to various embodiments of the disclosure.

FIG. 10 sets forth a flow chart illustrating an example method of detecting modifications to recently stored data according to various embodiments of the disclosure. The example method depicted in FIG. 10 is similar to the example method depicted in FIG. 7, as the example method depicted in FIG. 10 also includes generating 702, in a storage system, a set of fingerprints of stored data that is associated with recently received I/O requests, in response to receiving a write request, generating 704 a fingerprint of write data of the write request, determining 706 that at least a partial fingerprint match exists between one or more fingerprints of the set of fingerprints and the fingerprint of the write data and, based on the determination, generating 708 a reduced combination of the stored data and the write data.

The example method depicted in FIG. 10 differs from the example method depicted in FIG. 7 in that the example method depicted in FIG. 10 includes storing 1002 one or more differences between the stored data and the write data of the received write request. Once the above-described hash value comparison has revealed that a stored data object is similar (e.g., up to a threshold level) to the write data, a difference between the stored data and the write data can be calculated. Then in preference to storing an entirety of the write data, just the difference between the stored data and the write data can be stored in response to the write request that requested storage of the write data, thereby using less storage space.

Figure 11:
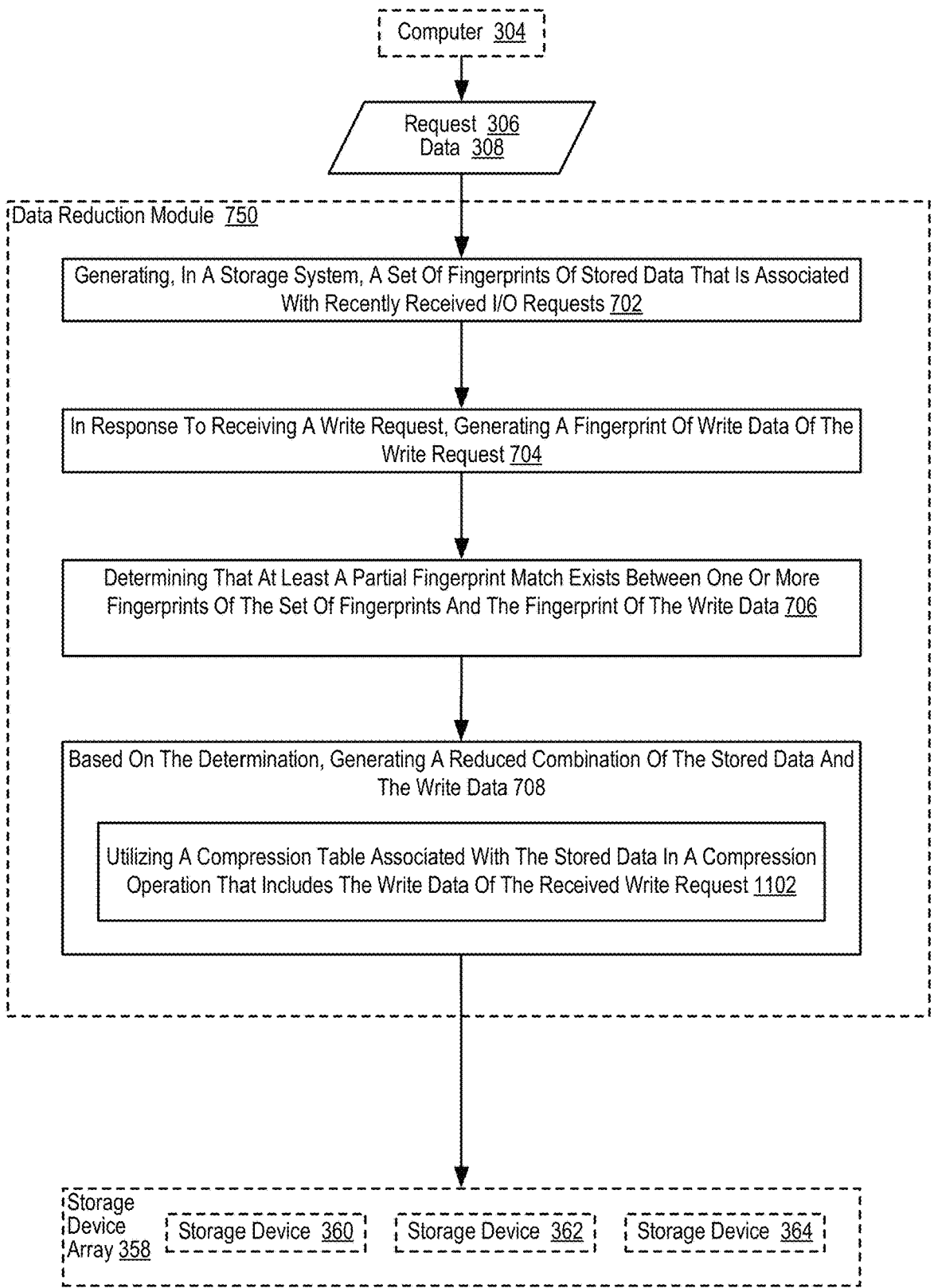
FIG. 11 sets forth a flow chart illustrating an example method of detecting modifications to recently stored data according to various embodiments of the disclosure.

FIG. 11 sets forth a flow chart illustrating an example method of detecting modifications to recently stored data according to various embodiments of the disclosure. The example method depicted in FIG. 11 is similar to the example method depicted in FIG. 7, as the example method depicted in FIG. 11 also includes generating 702, in a storage system, a set of fingerprints of stored data that is associated with recently received I/O requests, in response to receiving a write request, generating 704 a fingerprint of write data of the write request, determining 706 that at least a partial fingerprint match exists between one or more fingerprints of the set of fingerprints and the fingerprint of the write data and, based on the determination, generating 708 a reduced combination of the stored data and the write data.

The example method depicted in FIG. 11 differs from the example method depicted in FIG. 7 in that the example method depicted in FIG. 11 includes utilizing 1102 a compression table associated with the stored data in a compression operation that includes the write data of the received write request. As used herein, the term compression table can refer to a table or other data structure that stores records of replacements made when compressing some data, such that the table can be used to undo the compression when the original data is needed. It will be appreciated that since the write data is similar up to some threshold level to a stored data object, a compression table used for the stored data object may be useful when compressing the write data.

Figure 12:
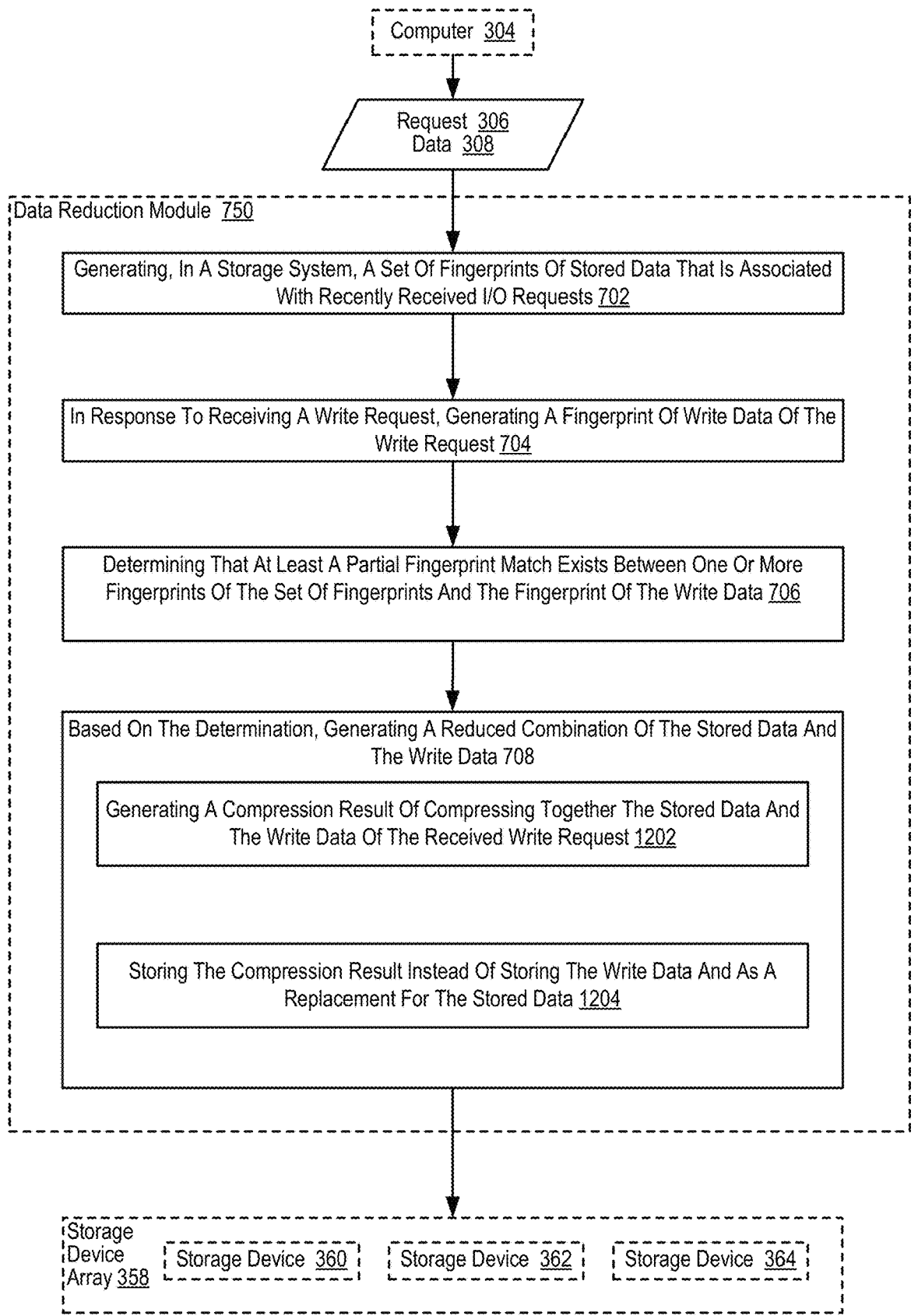
FIG. 12 sets forth a flow chart illustrating an example method of detecting modifications to recently stored data according to various embodiments of the disclosure.

FIG. 12 sets forth a flow chart illustrating an example method of detecting modifications to recently stored data according to various embodiments of the disclosure. The example method depicted in FIG. 12 is similar to the example method depicted in FIG. 7, as the example method depicted in FIG. 12 also includes generating 702, in a storage system, a set of fingerprints of stored data that is associated with recently received I/O requests, in response to receiving a write request, generating 704 a fingerprint of write data of the write request, determining 706 that at least a partial fingerprint match exists between one or more fingerprints of the set of fingerprints and the fingerprint of the write data and, based on the determination, generating 708 a reduced combination of the stored data and the write data.

The example method depicted in FIG. 12 differs from the example method depicted in FIG. 7 in that example method depicted in FIG. 12 includes generating 1202 a compression result of compressing together the stored data and the write data of the received write request. Generating 1202 a compression result of compressing together the stored data and the write data of the received write request can include applying a compression algorithm to a combined data object that includes the stored data object and the write data that were determined to have a threshold level of similarity. The compression result, or the compression algorithm's output, can represent a reduced version of the stored data object as modified by the write request that included the write data.

The example method depicted in FIG. 12 also includes storing 1204 the compression result instead of storing the write data and as a replacement for the stored data. In one embodiment, storing 1204 the compression result instead of storing the write data and as a replacement for the stored data can include storing, at the address where the write data was requested to be stored, the compression result. Alternatively, the compression result can be stored at any storage location with a reference to the storage location being stored at the address where the write data was requested to be stored. In a related embodiment, the stored data object can be replaced with the compression result, with a reference to the stored data object's storage location being stored where the write data was requested to be stored.

Figure 13:
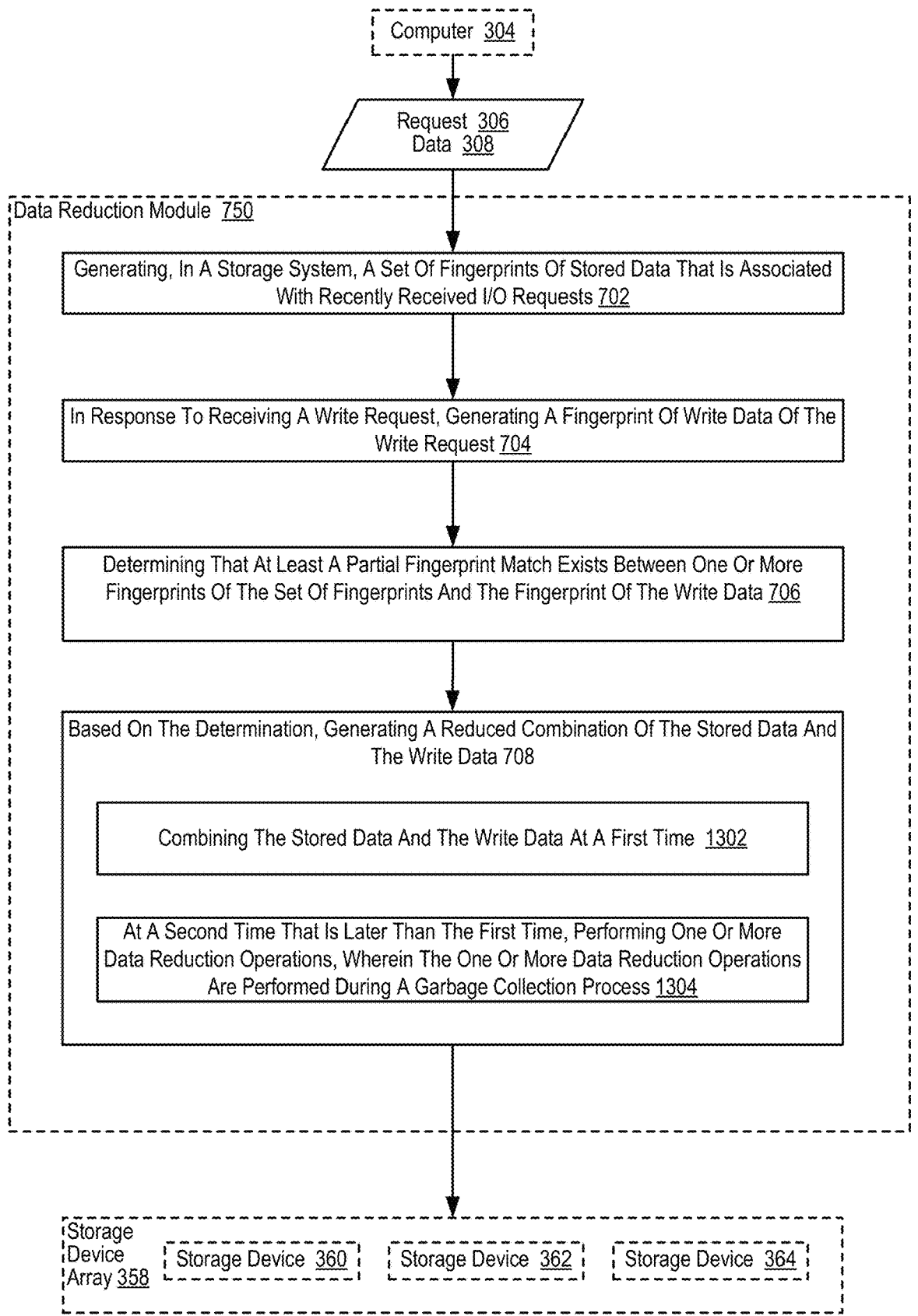
FIG. 13 sets forth a flow chart illustrating an example method of detecting modifications to recently stored data according to various embodiments of the disclosure.

FIG. 13 sets forth a flow chart illustrating an example method of detecting modifications to recently stored data according to various embodiments of the disclosure. The example method depicted in FIG. 13 is similar to the example method depicted in FIG. 7, as the example method depicted in FIG. 13 also includes generating 702, in a storage system, a set of fingerprints of stored data that is associated with recently received I/O requests, in response to receiving a write request, generating 704 a fingerprint of write data of the write request, determining 706 that at least a partial fingerprint match exists between one or more fingerprints of the set of fingerprints and the fingerprint of the write data and, based on the determination, generating 708 a reduced combination of the stored data and the write data.

The example method depicted in FIG. 13 differs from the example method depicted in FIG. 7 in that the example method depicted in FIG. 13 includes combining 1302 the stored data and the write data at a first time. Combining 1302 the stored data and the write data at a first time can include storing together (or combining references to) the stored data object that partially matches the write data. The combining can include indicating, to a garbage collection process, that the stored data object and the write data are to be processed together for garbage collection.

The example method depicted in FIG. 13 includes at a second time that is later than the first time, performing 1304 one or more data reduction operations, wherein the one or more data reduction operations are performed during a garbage collection process. In one embodiment, a garbage collection process can perform various data reduction operations, including compressing similar data, reclaiming memory that was being used for unneeded data, or the like. In one embodiment, garbage collection processes can determine differences between the stored data object and the write data and then reclaim memory that was or would have been used for duplicative data portions. Garbage collection processes can also perform compression on the combined stored data object and write data in order to generate a reduced combination of the two objects.

Figure 14:
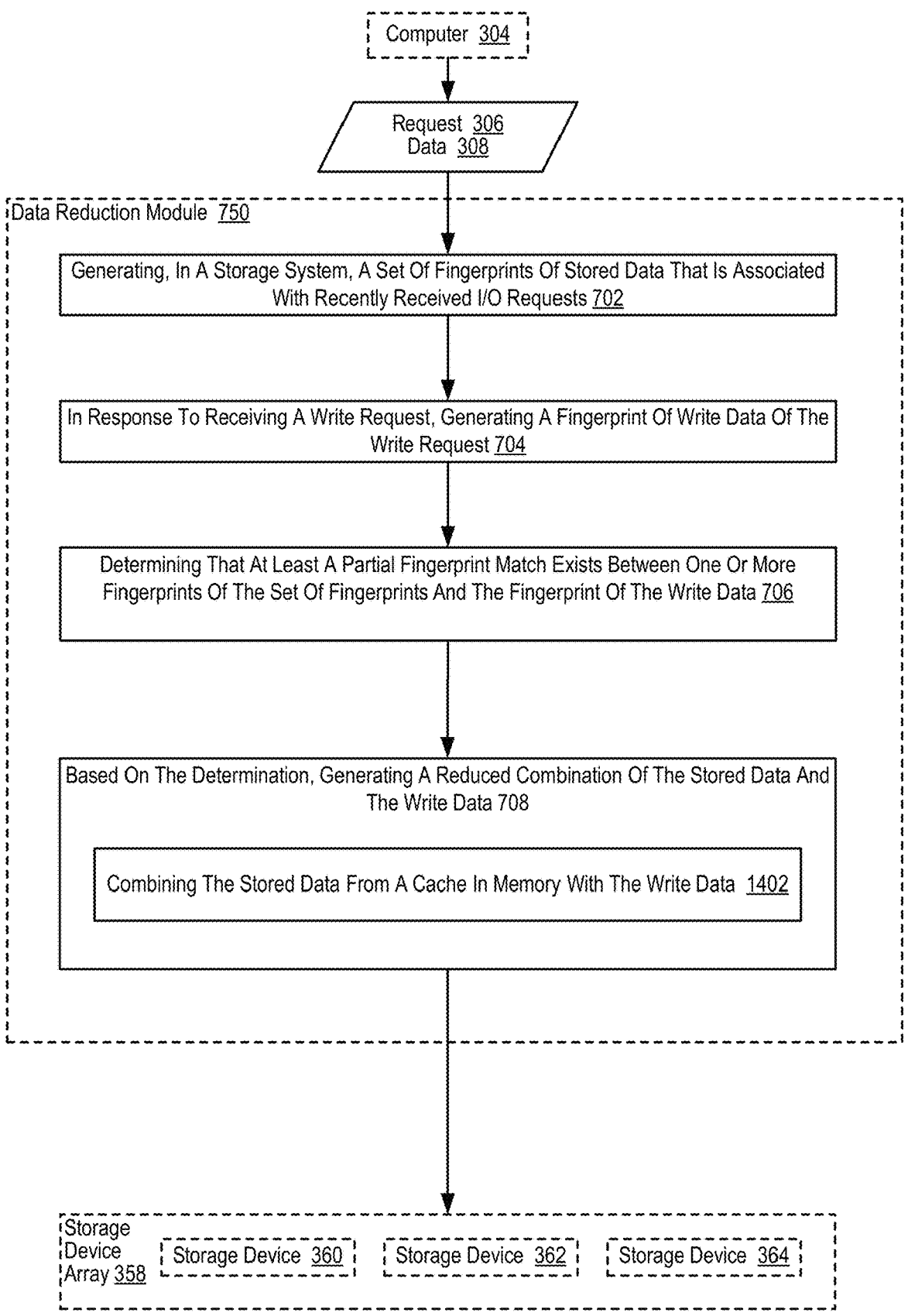
FIG. 14 sets forth a flow chart illustrating an example method of detecting modifications to recently stored data according to various embodiments of the disclosure.

FIG. 14 sets forth a flow chart illustrating an example method of detecting modifications to recently stored data according to various embodiments of the disclosure. The example method depicted in FIG. 14 is similar to the example method depicted in FIG. 7, as the example method depicted in FIG. 14 also includes generating 702, in a storage system, a set of fingerprints of stored data that is associated with recently received I/O requests, in response to receiving a write request, generating 704 a fingerprint of write data of the write request, determining 706 that at least a partial fingerprint match exists between one or more fingerprints of the set of fingerprints and the fingerprint of the write data and, based on the determination, generating 708 a reduced combination of the stored data and the write data.

The example method depicted in FIG. 14 differs from the example method depicted in FIG. 7 in that the example method depicted in FIG. 14 includes combining 1402 the stored data from a cache in memory with the write data. Combining 1402 the stored data from a cache in memory with the write data can include using a cache of data blocks from recent read and write requests to combine data inline with the write data from the write request. Readers will appreciate that, in-memory hash values can be associated with a much larger set of recently stored data objects. However, combining the stored data objects and the write data may be delayed until after the write has been persisted. Alternatively, the combining of any data blocks identified from a recent fingerprint cache may be delayed until garbage collection).

Additionally, the above-described techniques can also be used to detect a combination of database tablespace writes and writes of database archive redo logs or database archive logs that contain variants of the same data. Readers will appreciate that database tablespace writes may write data that has more than a threshold level similarity to write data stored with respect to logs, such as a database archive redo logs. Accordingly, in one embodiment, writes to logs and to tablespaces can be detected. Hash values can be retained as described above for recently written data in the logs or tablespaces. Based on a comparison of block-based hash values between two written data items (e.g., a write data object from a tablespace write and another a write data object from an archive log), it may be determined that the two data items have some level of similarity (e.g., satisfying a threshold). Based on the determination that the items are similar, write data from tablespace writes and log writes can be compressed together without the expense of a complete fingerprint table for all storage of the storage system.

Example embodiments of the present disclosure are described largely in the context of a fully functional computer system. Readers of skill in the art will recognize, however, that the present disclosure also may be embodied in a computer program product disposed upon computer readable media for use with any suitable data processing system. Such computer readable storage media may be any transitory or non-transitory media. Examples of such media include storage media for machine-readable information, including magnetic media, optical media, or other suitable media. Examples of such media also include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the example embodiments described in this specification are oriented to software installed and executing on computer hardware, nevertheless, alternative embodiments implemented as firmware, as hardware, or as an aggregation of hardware and software are well within the scope of embodiments of the present disclosure.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method comprising:

generating, in a storage system, a set of fingerprints of stored data that is associated with recently received I/O requests;

in response to receiving a write request, generating a fingerprint of write data of the write request;

determining that at least a partial fingerprint match exists between one or more fingerprints of the set of fingerprints and the fingerprint of the write data; and based on the determination, generating a reduced combination of the stored data and the write data, wherein the reduced combination represents a compression result of compressing together the stored data and the write data.

2. The method of claim 1, further comprising:

generating the set of fingerprints by calculating hash values of one or more data objects of the stored data, and retaining a subset of the calculated hash values of the one or more data objects as the set of fingerprints; and generating the fingerprint of the write data by calculating a hash value for the write data.

3. The method of claim 2, wherein determining that at least a partial fingerprint match exists further comprises determining that at least one hash value of the retained subset of the calculated hash values of the one or more data objects at least partially matches the hash value for the write data.

4. The method of claim 1, wherein generating the reduced combination further comprises:

utilizing a compression table associated with the stored data in a compression operation that includes the write data of the received write request.

5. The method of claim 1, wherein generating the reduced combination further comprises:

storing the compression result instead of storing the write data and as a replacement for the stored data.

6. The method of claim 1, wherein generating the reduced combination further comprises:

combining the stored data and the write data at a first time; and at a second time that is later than the first time, performing one or more data reduction operations, wherein the one or more data reduction operations are performed during a garbage collection process.

7. The method of claim 1, wherein the stored data is cached in memory, and wherein generating the reduced combination further comprises:

combining the stored data from a cache in memory with the write data.

8. The method of claim 1, wherein at least one of the recently received I/O requests comprises read requests, and the stored data includes data provided in response to the read requests.

9. The method of claim 1, wherein at least one of the recently received I/O requests comprises write requests, and the stored data includes data provided in response to the write requests.

10. An apparatus comprising a memory;

a processing device, operatively coupled to the memory, configured to:

generate, in a storage system, a set of fingerprints of stored data that is associated with recently received I/O requests;

in response to receiving a write request, generate a fingerprint of write data of the write request;

determine that at least a partial fingerprint match exists between one or more fingerprints of the set of fingerprints and the fingerprint of the write data; and based on the determination, generate a reduced combination of the stored data and the write data, wherein the reduced combination represents a compression result of compressing together the stored data and the write data.

11. The apparatus of claim 10, wherein the processing device is further configured to generate the set of fingerprints by calculating hash values of one or more data objects of the stored data, and retaining a subset of the calculated hash values of the one or more data objects as the set of fingerprints; and generate the fingerprint of the write data by calculating a hash value for the write data.

12. The apparatus of claim 11, wherein the processing device is further configured to:

determine that at least a partial fingerprint match exists by determining that at least one hash value of the retained subset of the calculated hash values of the one or more data objects at least partially matches the hash value for the write data.

13. The apparatus of claim 11, wherein the processing device is further configured to:

utilize a compression table associated with the stored data in a compression operation that includes the write data of the received write request.

14. A non-transitory computer readable storage medium storing instructions that, when executed, cause a processing device to:

generate, in a storage system, a set of fingerprints of stored data that is associated with recently received I/O requests;

in response to receiving a write request, generate a fingerprint of write data of the write request;

determine that at least a partial fingerprint match exists between one or more fingerprints of the set of fingerprints and the fingerprint of the write data; and based on the determination, generate a reduced combination of the stored data and the write data, wherein the reduced combination represents a compression result of compressing together the stored data and the write data.

15. The non-transitory computer readable storage medium of claim 14, wherein the processing device is further configured to:

generate the set of fingerprints by calculating hash values of one or more data objects of the stored data, and retaining a subset of the calculated hash values of the one or more data objects as the set of fingerprints; and generate the fingerprint of the write data by calculating a hash value for the write data.

16. The non-transitory computer readable storage medium of claim 14, wherein the processing device is further configured to:

utilize a compression table associated with the stored data in a compression operation that includes the write data of the received write request.

17. The non-transitory computer readable storage medium of claim 14, wherein the processing device is further configured to:

store the compression result instead of storing the write data and as a replacement for the stored data.

* * * * *